US012613644B2

(12) United States Patent (10) Patent No.: US 12,613,644 B2
Cheng (45) Date of Patent: Apr. 28, 2026

(54) MEMORY SYSTEM, ELECTRONIC APPARATUS AND OPERATING METHOD THEREOF, HOST SYSTEM, AND STORAGE MEDIUM

(71) Applicant: YANGTZE MEMORY TECHNOLOGIES CO., LTD., Wuhan (CN)

(72) Inventor: Mo Cheng, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 112 days.

(21) Appl. No.: 18/422,873

(22) Filed: Jan. 25, 2024

(65) Prior Publication Data

US 2025/0103221 A1 Mar. 27, 2025

(30) Foreign Application Priority Data

Sep. 25, 2023 (CN) .......................... 202311246047.1

(51) Int. Cl.
*G06F 3/06* (2006.01)
(52) U.S. Cl.
CPC .......... *G06F 3/0625* (2013.01); *G06F 3/0647* (2013.01); *G06F 3/0679* (2013.01)
(58) Field of Classification Search
CPC .... G06F 3/0625; G06F 3/0647; G06F 3/0679; G06F 3/0611; G06F 3/0659; G06F 3/068; G06F 3/0608; G06F 3/0653; G06F 3/0619; G06F 3/0632; G06F 12/0802; (Continued)

(56) References Cited

U.S. PATENT DOCUMENTS

2006/0143393 A1* 6/2006 Petev .................... G06F 12/122
                                                        711/E12.071
2011/0010569 A1* 1/2011 Obr .......................... G06F 1/30
                                                        713/340
2017/0132154 A1* 5/2017 Bakke .................... G06F 3/065
(Continued)

FOREIGN PATENT DOCUMENTS

CN 107122135 A 9/2017
CN 109933540 A 6/2019
(Continued)

OTHER PUBLICATIONS

Yangtze Memory Technologies Co., Ltd., "First Examination Opinion Notice," Date of Pub.: Sep. 16, 2025, CN App No. 202311246047. 1, 7 p. (plus 7 p. translation).

*Primary Examiner* — Tracy C Chan
(74) *Attorney, Agent, or Firm* — Conley Rose, P.C.

(57) ABSTRACT

Examples of the present disclosure provide a memory system, electronic apparatus and operating method thereof, host system, and storage medium; wherein the memory system includes: a memory device including a first memory area and a second memory area, the first memory area includes a plurality of first memory cells employing a single-level mode to store data, the second memory area includes a plurality of second memory cells employing a multi-level mode to store data; a memory controller coupled to the memory device and configured to: based on the current storage space of the first memory area and at least one adjustment threshold, transfer data stored in the first memory area to the second memory area according to a preset transfer mode.

20 Claims, 14 Drawing Sheets

(58) Field of Classification Search
CPC ............. G06F 12/0811; G06F 12/0862; G06F
12/0246; G06F 9/5033; G06F 9/505
See application file for complete search history.

(56) References Cited

U.S. PATENT DOCUMENTS

| 2020/0409856 A1* | 12/2020 | Navon | G06F 12/123 |
| 2021/0011642 A1 | 1/2021 | Lee | |
| 2023/0376205 A1* | 11/2023 | Onorato | G06F 3/0611 |
| 2024/0160386 A1* | 5/2024 | Bueb | G11C 7/04 |

FOREIGN PATENT DOCUMENTS

| CN | 111241002 A | 6/2020 |
| CN | 115512733 A | 12/2022 |

* cited by examiner

```
HOST SYSTEM          MEMORY              MEMORY
                     CONTROLLER          DEVICE

THIRD INSTRUCTION
   ──────────────────────────►

FOURTH INSTRUCTION
   ──────────────────────────►        PERFORM DATA TRANSFER
                                       IN RESPONSE TO THE
                                       FOURTH INSTRUCTION
                                   ──────────────────────────►
```

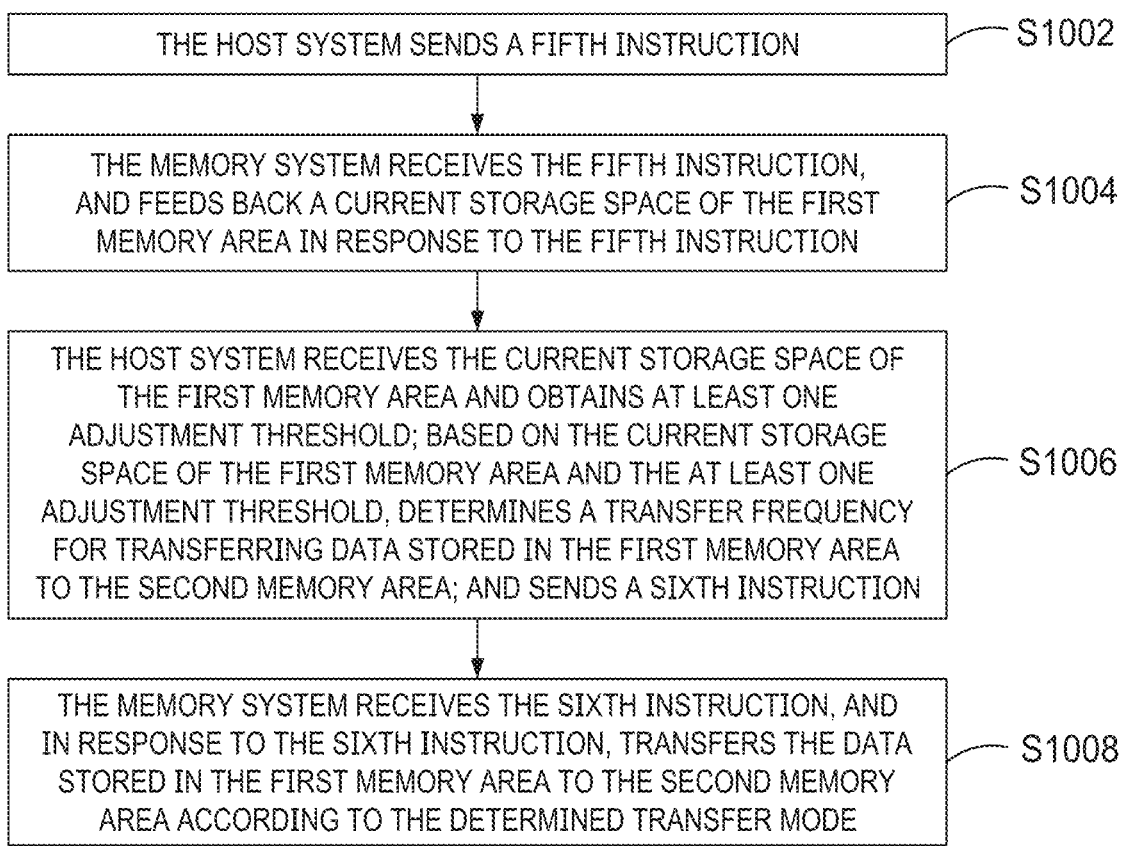

THE HOST SYSTEM SENDS A FIFTH INSTRUCTION — S1002

THE MEMORY SYSTEM RECEIVES THE FIFTH INSTRUCTION, AND FEEDS BACK A CURRENT STORAGE SPACE OF THE FIRST MEMORY AREA IN RESPONSE TO THE FIFTH INSTRUCTION — S1004

THE HOST SYSTEM RECEIVES THE CURRENT STORAGE SPACE OF THE FIRST MEMORY AREA AND OBTAINS AT LEAST ONE ADJUSTMENT THRESHOLD; BASED ON THE CURRENT STORAGE SPACE OF THE FIRST MEMORY AREA AND THE AT LEAST ONE ADJUSTMENT THRESHOLD, DETERMINES A TRANSFER FREQUENCY FOR TRANSFERRING DATA STORED IN THE FIRST MEMORY AREA TO THE SECOND MEMORY AREA; AND SENDS A SIXTH INSTRUCTION — S1006

THE MEMORY SYSTEM RECEIVES THE SIXTH INSTRUCTION, AND IN RESPONSE TO THE SIXTH INSTRUCTION, TRANSFERS THE DATA STORED IN THE FIRST MEMORY AREA TO THE SECOND MEMORY AREA ACCORDING TO THE DETERMINED TRANSFER MODE — S1008

FIG. 10B

MEMORY SYSTEM, ELECTRONIC APPARATUS AND OPERATING METHOD THEREOF, HOST SYSTEM, AND STORAGE MEDIUM

CROSS-REFERENCE TO RELATED APPLICATIONS

The present disclosure claims priority to Chinese Patent Application No. 2023112460471, which was filed Sep. 25, 2023, is titled "MEMORY SYSTEM, ELECTRONIC EQUIPMENT AND OPERATING METHOD, HOST SYSTEM, STORAGE MEDIUM," and is hereby incorporated herein by reference in its entirety.

TECHNICAL FIELD

Examples of the present disclosure relate to the field of semiconductor technology, and in particular to a memory system, electronic apparatus and operating method thereof, host system, and storage medium.

BACKGROUND

A memory device is a memory apparatus used to preserve information in modern information technology. As a typical non-volatile semiconductor memory, Not-And (NAND) type memory has gradually become a mainstream product in the storage market due to its high storage density, controllable production cost, suitable programming and erasing speed and retention characteristics.

SUMMARY

Examples of the present disclosure propose a memory system, electronic apparatus and operating method thereof, host system, and storage medium.

An example of the present disclosure provides a memory system comprising: a memory device including a first memory area and a second memory area, the first memory area includes a plurality of first memory cells employing a single-level mode to store data, the second memory area includes a plurality of second memory cells employing a multi-level mode to store data; a memory controller coupled to the memory device and configured to: based on the current storage space of the first memory area and at least one adjustment threshold, transfer data stored in the first memory area to the second memory area according to a preset transfer mode.

In some examples, the at least one adjustment threshold includes a plurality of adjustment thresholds; the memory controller is configured to: based on the magnitude relationship between the proportion of the current storage space of the first memory area to the total space and the plurality of adjustment thresholds, determine a transfer mode for transferring data stored in the first memory area to the second memory area, different transfer modes corresponding to different transfer frequencies and/or transfer data amount.

In some examples, the plurality of adjustment thresholds include a first adjustment threshold corresponding to a first proportion, a second adjustment threshold corresponding to a second proportion and a third adjustment threshold corresponding to a third proportion, the first proportion is less than the second proportion, and the second proportion is less than the third proportion; the memory controller is configured to: when the proportion of the current storage space of the first memory area to the total space is less than or equal to the first proportion, transfer at least part of the data stored in the first memory area to the second memory area according to a first frequency using a first transfer mode; when the proportion of the current storage space of the first memory area to the total space is greater than the first proportion and less than the second proportion, transferring part of the data stored in the first memory area to the second memory area according to a second frequency using a second transfer mode; when the proportion of the current storage space of the first memory area to the total space is greater than the third proportion, transfer at most part of the data stored in the first memory area to the second memory area according to a third frequency using a third transfer mode; wherein, the first frequency corresponding to the first transfer mode is greater than the second frequency corresponding to the second transfer mode, and the second frequency corresponding to the second transfer mode is greater than the third frequency corresponding to the third transfer mode.

In some examples, the first transfer mode is to continue data transfer when the storage memory system is in an idle state until all data is transferred or the storage memory system exits the idle state; the second transfer mode is to transfer part of the data amount when the storage memory system is in an idle state; the third transfer mode is to stop data transfer.

In some examples, the memory controller is configured to: receive a first instruction, the first instruction instructing the storage memory system to enter the automatic adjustment mode; in response to the first instruction, receive a second instruction, the second instruction including the at least one adjustment threshold; and obtain a current storage space of the first memory area based on a preset period.

In some examples, the memory controller is further configured to: receive a third instruction, the third instruction instructing the storage memory system to enter the passive adjustment mode; after the third instruction, receive a fourth instruction, the fourth instruction instructs to transfer data stored in the first memory area to the second memory area based on the specified transfer mode; in response to the fourth instruction, transfer data stored in the first memory area to the second memory area based on the specified transfer mode.

In some examples, the memory controller is configured to: control the memory device to read the data stored in the first memory area according to a preset transfer mode, and write the read data into the second memory area.

An example of the present disclosure further provides a host system, including: a memory section; an interface; a controller section configured to send a first instruction with the interface, the first instruction instructing the memory system to enter the automatic adjustment mode; the memory system includes a memory device, the memory device including a first memory area and a second memory area, the first memory area includes a plurality of first memory cells employing a single-level mode to store data, the second memory area includes a plurality of second memory cells employing a multi-level mode to store data; after sending the first instruction, send a second instruction, the second instruction including at least one adjustment threshold, the at least one adjustment threshold and the current storage space of the first memory area provide a basis for a transfer mode of transferring data stored in the first memory area to the second memory area.

In some examples, the controller section is further configured to: send a third instruction, the third instruction instructing the storage memory system to enter a passive adjustment mode; after sending the third instruction, send a fourth instruction, the fourth instruction instructs to transfer data stored in the first memory area to the second memory area based on the specified transfer mode.

An example of the present disclosure further provides an electronic apparatus including a host system and a memory system coupled to the host system; wherein, the memory system includes a memory device, the memory device including a first memory area and a second memory area, the first memory area includes a plurality of first memory cells employing a single-level mode to store data, the second memory area includes a plurality of second memory cells employing a multi-level mode to store data; the host system is configured to send a first instruction; the memory system is configured to receive the first instruction and enter an automatic adjustment mode in response to the first instruction; the host system is configured to send a second instruction after the first instruction, the second instruction including at least one adjustment threshold; the memory system is further configured to: receive the second instruction; obtain the current storage space of the first memory area; based on the current storage space of the first memory area and the at least one adjustment threshold, transfer data stored in the first memory area to the second memory area based on a preset mode.

In some examples, the host system is further configured to: send a third instruction; the memory system is further configured to receive the third instruction and enter an passive adjustment mode in response to the third instruction; the host system is further configured to send a fourth instruction after sending the third instruction; the memory system is further configured to: in response to the fourth instruction, transfer data stored in the first memory area to the second memory area based on the specified transfer mode.

An example of the present disclosure further provides an electronic apparatus including a host system and a memory system coupled to the host system; wherein, the memory system includes a memory device, the memory device including a first memory area and a second memory area, the first memory area includes a plurality of first memory cells employing a single-level mode to store data, the second memory area includes a plurality of second memory cells employing a multi-level mode to store data; the host system is configured to send a fifth instruction; the memory system is configured to receive the fifth instruction and feed back a current storage space of the first memory area in response to the fifth instruction; the host system is further configured to: receive the current storage space of the first memory area and obtain at least one adjustment threshold; based on the current storage space of the first memory area and the at least one adjustment threshold, determine a transfer mode for transferring data stored in the first memory area to the second memory area; and send a sixth instruction; the memory system is configured to: receive the sixth instruction, and in response to the sixth instruction, transfer data stored in the first memory area to the second memory area based on the determined transfer mode.

An example of the present disclosure further provides an operating method of a memory system, the memory system includes a memory device, the memory device including a first memory area and a second memory area, the first memory area includes a plurality of first memory cells employing a single-level mode to store data, the second memory area includes a plurality of second memory cells employing a multi-level mode to store data; the operating method includes: based on the current storage space of the first memory area and the at least one adjustment threshold, transferring the data stored in the first memory area to the second memory area according to a preset transfer mode.

In some examples, the at least one adjustment threshold includes a plurality of adjustment thresholds; based on the current storage space of the first memory area and at least one adjustment threshold, transferring at least part of the data stored in the first memory area to the second memory area according to a preset transfer frequency includes: based on the magnitude relationship between the proportion of the current storage space of the first memory area to the total space and the plurality of adjustment thresholds, determining a transfer mode for transferring data stored in the first memory area to the second memory area, different transfer modes corresponding to different transfer frequencies and/or transfer data amount.

In some examples, the plurality of adjustment thresholds include a first adjustment threshold corresponding to a first proportion, a second adjustment threshold corresponding to a second proportion and a third adjustment threshold corresponding to a third proportion, the first proportion is less than the second proportion, and the second proportion is less than the third proportion; the determining a transfer mode for transferring at least part of the data stored in the first memory area to the second memory area based on the magnitude relationship between the proportion of the current storage space of the first memory area to the total space and the plurality of adjustment thresholds including: when the proportion of the current storage space of the first memory area to the total space is less than or equal to the first proportion, transferring at least part of the data stored in the first memory area to the second memory area according to a first frequency using a first transfer mode; when the proportion of the current storage space of the first memory area to the total space is greater than the first proportion and less than the second proportion, transferring part of the data stored in the first memory area to the second memory area according to a second frequency using a second transfer mode; when the proportion of the current storage space of the first memory area to the total space is greater than the third proportion, transferring at most part of the data stored in the first memory area to the second memory area using a third transfer mode; wherein, the first frequency corresponding to the first transfer mode is greater than the second frequency corresponding to the second transfer mode, and the second frequency corresponding to the second transfer mode is greater than the third frequency corresponding to the third transfer mode.

In some examples, the method further includes: receiving a first instruction, the first instruction instructing the storage memory system to enter the automatic adjustment mode; in response to the first instruction, receiving a second instruction, the second instruction including the at least one adjustment threshold; and obtaining a current storage space of the first memory area based on a preset period.

In some examples, the method further includes: receiving a third instruction, the third instruction instructing the storage memory system to enter a passive adjustment mode; after the third instruction, receiving a fourth instruction, the fourth instruction instructs to transfer data stored in the first memory area to the second memory area based on the specified transfer mode; in response to the fourth instruction, transferring the data stored in the first memory area to the second memory area based on the specified transfer mode.

In some examples, the transferring at least part of the data stored in the first memory area to the second memory area according to a preset transfer mode includes: reading at least part of the data stored in the first memory area according to a preset transfer mode, and writing the read part of the data into the second memory area.

An example of the present disclosure further provides an operating method of an electronic apparatus, the electronic apparatus including a host system and a memory system coupled to the host system; wherein, the memory system includes a memory device, the memory device including a first memory area and a second memory area, the first memory area includes a plurality of first memory cells employing a single-level mode to store data, the second memory area includes a plurality of second memory cells employing a multi-level mode to store data; the method including: sending, by the host system, a first instruction; receiving, by the memory system, the first instruction and entering an automatic adjustment mode in response to the first instruction; sending, by the host system, a second instruction after the first instruction, the second instruction including at least one adjustment threshold; receiving, by the memory system, the second instruction; obtaining a current storage space of the first memory area based on a preset period; based on the current storage space of the first memory area and the at least one adjustment threshold, transferring the data stored in the first memory area to the second memory area according to a preset transfer mode.

In some examples, the method further includes: sending, by the host system, a third instruction; receiving, by the memory system, the third instruction and entering an passive adjustment mode in response to the third instruction; sending, by the host system, a fourth instruction after sending the third instruction; in response to the fourth instruction, transferring, by the memory system, the data stored in the first memory area to the second memory area based on the specified transfer mode.

An example of the present disclosure further provides an operating method of an electronic apparatus, the electronic apparatus including a host system and a memory system coupled to the host system; wherein the memory system includes a memory device, the memory device including a first memory area and a second memory area, the first memory area includes a plurality of first memory cells employing a single-level mode to store data, the second memory area includes second memory cells employing a multi-level mode to store data; the method including: sending, by the host system, a fifth instruction; by the memory system, receiving the fifth instruction and feeding back a current storage space of the first memory area in response to the fifth instruction; by the host system, receiving the current storage space of the first memory area and obtaining at least one adjustment threshold; based on the current storage space of the first memory area and the at least one adjustment threshold, determining a transfer frequency for transferring data stored in the first memory area to the second memory area; sending a sixth instruction; by the memory system, receiving the sixth instruction, and in response to the sixth instruction, transferring the data stored in the first memory area to the second memory area based on the determined transfer mode.

The present disclosure further provides a storage medium having executable instructions stored thereon, the executable instructions, when executed, may implement the operations of the methods described in the examples of the present disclosure.

In an example of the present disclosure, the read and write speed of the first memory area of the memory device in the memory system is greater than the read and write speed of the second memory area, and the memory controller in the memory system determines a transfer mode for transferring data in the first memory area to the second memory area based on the magnitude relationship between the current storage space of the first memory and at least one adjustment threshold. In the example of the present disclosure, based on the magnitude relationship between the remaining storage space of the first memory and the adjustment threshold, the transfer mode may be flexibly adjusted, to better adapt to different disclosure scenarios, taking into account smaller power consumption and better read and write performance.

BRIEF DESCRIPTION OF THE DRAWINGS

FIG. 4 is a schematic cross-sectional view of a memory cell array including NAND-type memory strings according to an example of the present disclosure.

FIG. 10B is a schematic flow diagram of operations of an operating method of another electronic apparatus provided by an example of the present disclosure.

Figure 1:
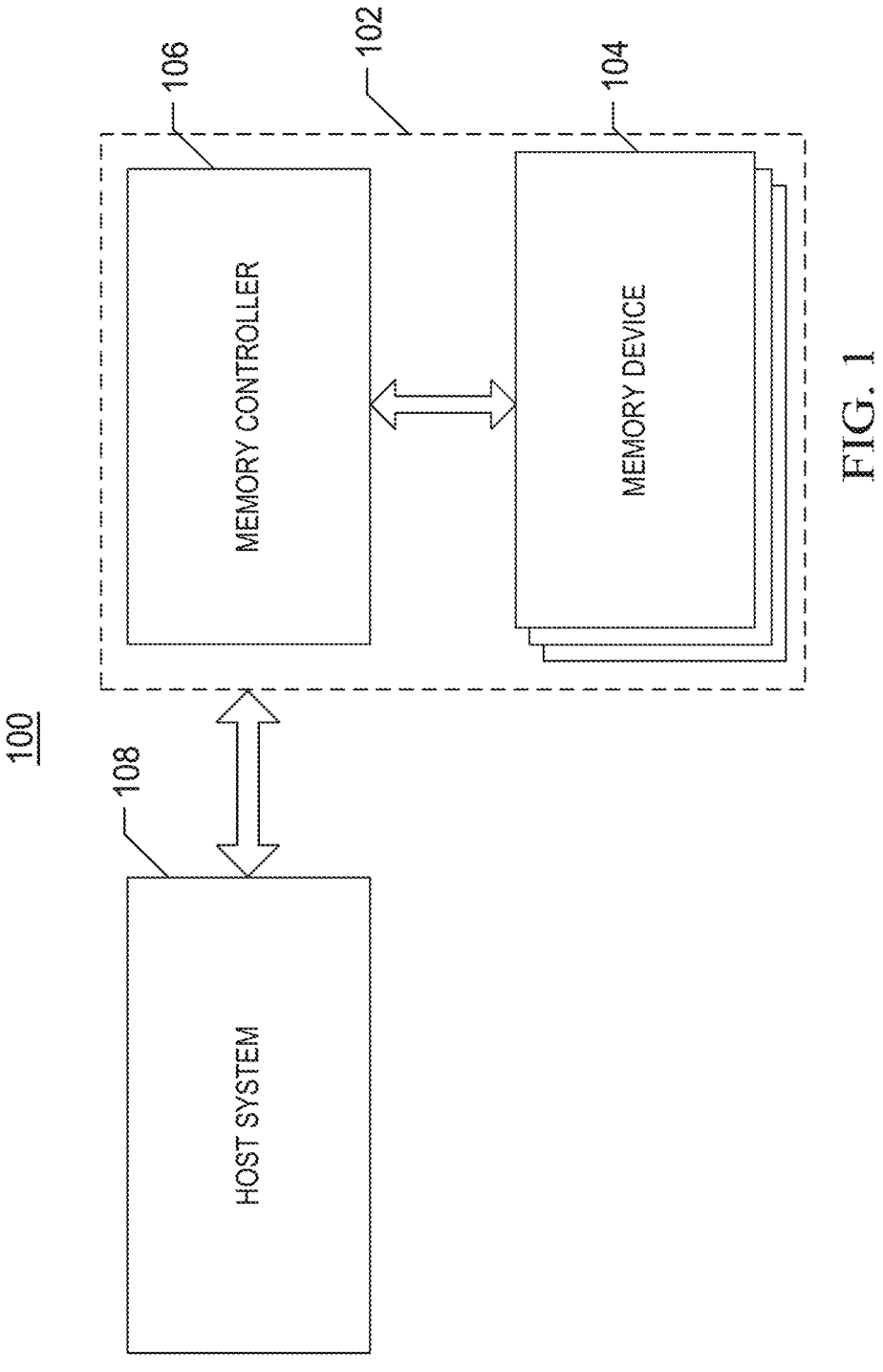
FIG. 1 is a schematic diagram of an exemplary system with a memory system according to an example of the present disclosure.

In the accompanying drawings described above (not necessarily drawn to scale), similar reference numbers may describe similar components throughout the different views. Similar reference numbers with different letter suffixes may represent different examples of similar components. The accompanying drawings generally illustrate the various examples discussed herein by way of example, and not limitation.

DETAILED DESCRIPTION

Example implementations applied in the present disclosure will be described in more detail below with reference to the accompanying drawings. Although example implementations of the present disclosure are shown in the accompanying drawings, it should be understood that the present disclosure may be implemented in various forms and should not be limited to the example implementations set forth herein. Rather, these examples are provided so that the present disclosure can be more thoroughly understood and the scope of the present disclosure can be fully conveyed to those skilled in the art.

In the following description, numerous example details are given in order to provide a more thorough understanding of the present disclosure. However, it will be apparent to one skilled in the art that the present disclosure may be practiced without one or more of these details. In other examples, in order to avoid confusion with the present disclosure, some technical features known in the art are not described; that is, not all features of the actual example are described here, and well-known functions and structures are not described in detail.

In the accompanying drawings, size of a layer, a region, an element and their relative sizes may be exaggerated for clarity. Like reference numerals refer to like elements throughout.

It will be understood that when an element or layer is referred to as being "on," "adjacent to," "connected to" or "coupled to" another element or layer, it may be directly on, adjacent to, connected to or coupled to another element or layer, or intervening elements or layers may be present. In contrast, when an element is referred to as being "directly on," "directly adjacent to," "directly connected to" or "directly coupled to" another element or layer, there is no intervening elements or layers present. It will be understood that, although the terms first, second, third etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be termed as a second element, component, region, layer or part without departing from teachings of the present disclosure. Whereas a second element, component, region, layer or part is discussed, it does not indicate that a first element, component, region, layer or part necessarily presents in the present disclosure.

The spatially relative terms such as "beneath", "below", "lower", "under", "above", "on", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the appended drawings is turned over, an element or a feature described as "below" or "beneath" or "under" another element or feature would then be oriented "above" another element or feature. Thus, exemplary terms "below" and "under" may encompass both directions of up and down. A device may be otherwise oriented (rotated 90 degrees or at other orientations) and the spatially relative descriptors used herein should be interpreted accordingly.

A term used herein is for the purpose of describing an example only and is not to be considered as limitation of the present disclosure. As used herein, the singular forms "a", "an" and "said/the" are intended to include the plural forms as well, unless the context clearly dictates otherwise. It should also be understood that the terms "comprised of" and/or "comprising", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

In order to understand the characteristics and technical content of examples of the present disclosure in more detail, implementations of examples of the present disclosure will be described in detail below in conjunction with the accompanying drawings, however, the accompanying drawings are for reference and description only, and are not intended to limit examples of the present disclosure.

Memory devices in examples of the present disclosure include but are not limited to a three-dimensional NAND memory, and for case of understanding, a three-dimensional NAND memory is used as an example for illustration.

FIG. 1 illustrates a block diagram of an exemplary system 100 with memory devices in accordance with some aspects of the present disclosure. The system 100 may be a mobile phone, a desktop computer, a laptop computer, a tablet, a vehicle computer, a gaming console, a printer, a positioning device, a wearable electronic apparatus, a smart sensor, a virtual reality (VR) device, an argument reality (AR) device, or any other suitable electronic apparatuses having a storage therein. As shown in FIG. 1, the system 100 may include a host system 108 and a memory system 102, and the memory system 102 has one or more memory devices 104 and a memory controller 106. The host system 108 may be a processor of an electronic apparatus (e.g., a central processing unit (CPU)) or a system on chip (SoC) (e.g., an disclosure processor (AP)). The host system 108 may be configured to send data to or receive data from memory device 104.

According to some implementations, memory controller 106 is coupled to the memory device 104 and the host system 108 and is configured to control the memory device 104. The memory controller 106 may manage data stored in the memory device 104 and communicate with the host system 108. In some implementations, memory controller 106 is designed to operate in low duty cycle environments, e.g., Secure Digital (SD) card, Compact Flash (CF) card, Universal Serial Bus (USB) flash drive, or other media for use in electronic apparatuses such as personal computer, digital camera, mobile phone, etc. In some implementations, the memory controller 106 is designed to operate in high duty cycle environment Solid State Disk (SSD) or embedded multimedia card (cMMC), where SSDs or eMMCs are used as data storage for mobile devices (such as smartphone, tablet computer, and laptop computer), and enterprise storage array.

Memory controller 106 may be configured to control operations of memory device 104, e.g., read, crase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is also configured to process error correction code (ECC) related to data read from or written to memory device 104. The memory controller 106 may also perform any other suitable functions, e.g., formatting the memory device 104. The memory controller 106 may communicate with external devices (e.g., the host system 108) according to an example communication protocol. For example, the memory controller 106 may communicate with an external device through at least one of various interface protocols, e.g., USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 2B:
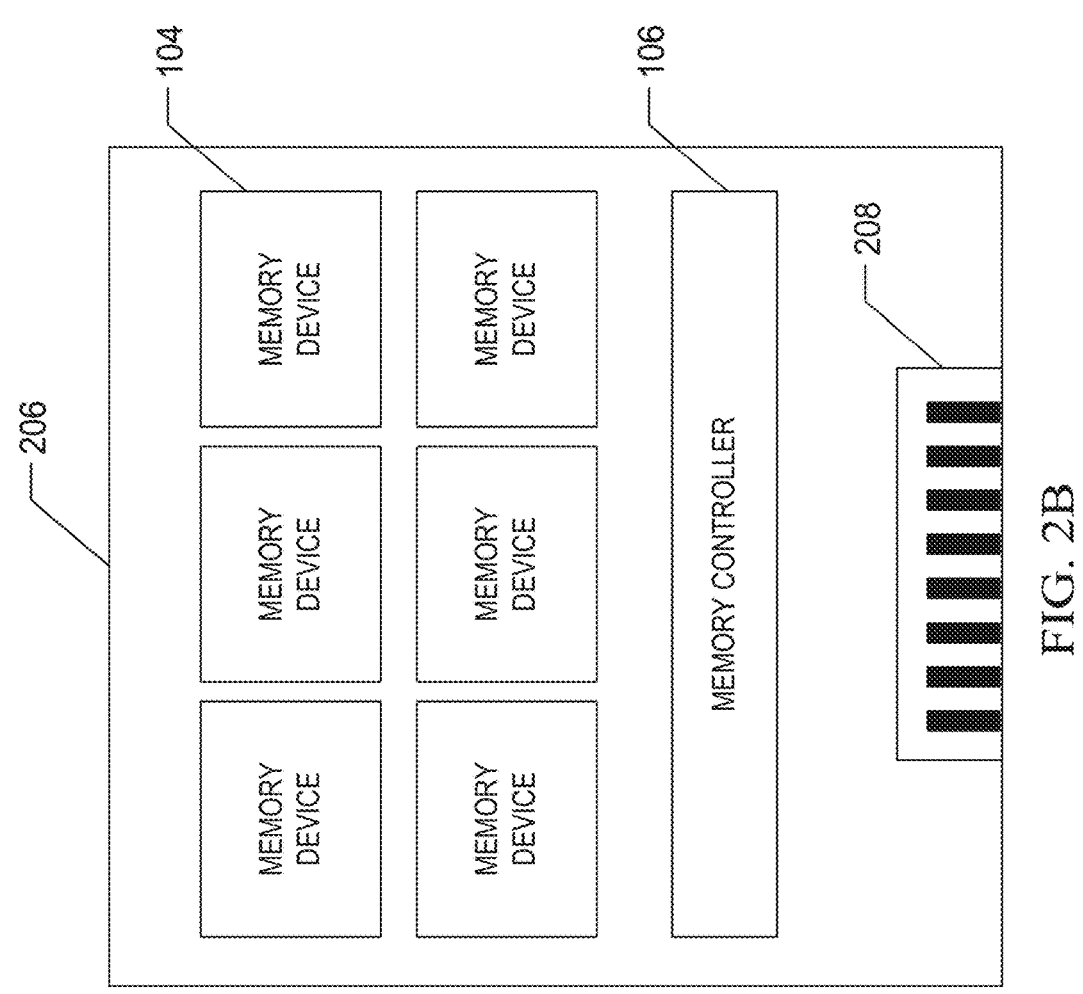
FIG. 2B is a schematic diagram of an exemplary solid state drive with a memory system according to an example of the present disclosure.
Figure 2A:
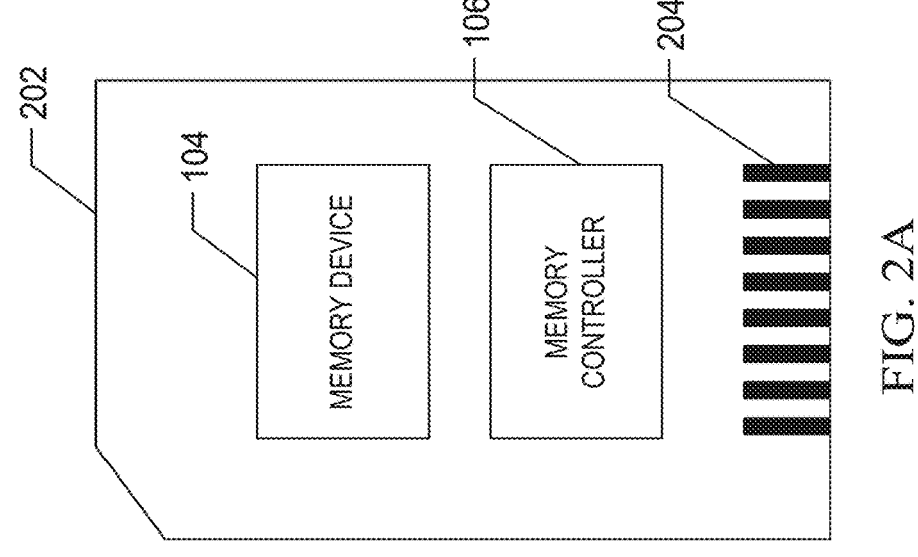
FIG. 2A is a schematic diagram of an exemplary memory card with a memory system according to an example of the present disclosure.

The memory controller 106 and one or more memory device 104 may be integrated into various types of storage devices, e.g., included in the same package (e.g., Universal Flash Storage (UFS) package or eMMC package). That is, memory system 102 may be implemented and packaged into different types of end electronic products. In one example as shown in FIG. 2A, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 may further include a memory card connector 24 coupling memory card 202 with a host (e.g., host system 108 in FIG. 1). In another example as shown in FIG. 2B, memory controller 106 and a plurality of memory devices 104 may be integrated into an SSD 206. The SSD 206 may further include an SSD connector 208 coupling the SSD 206 with a host (e.g., the host system 108 in FIG. 1). In some implementations, the storage capacity and/or operating speed of SSD 206 is greater than the storage capacity and/or operating speed of memory card 202.

Figure 3A:
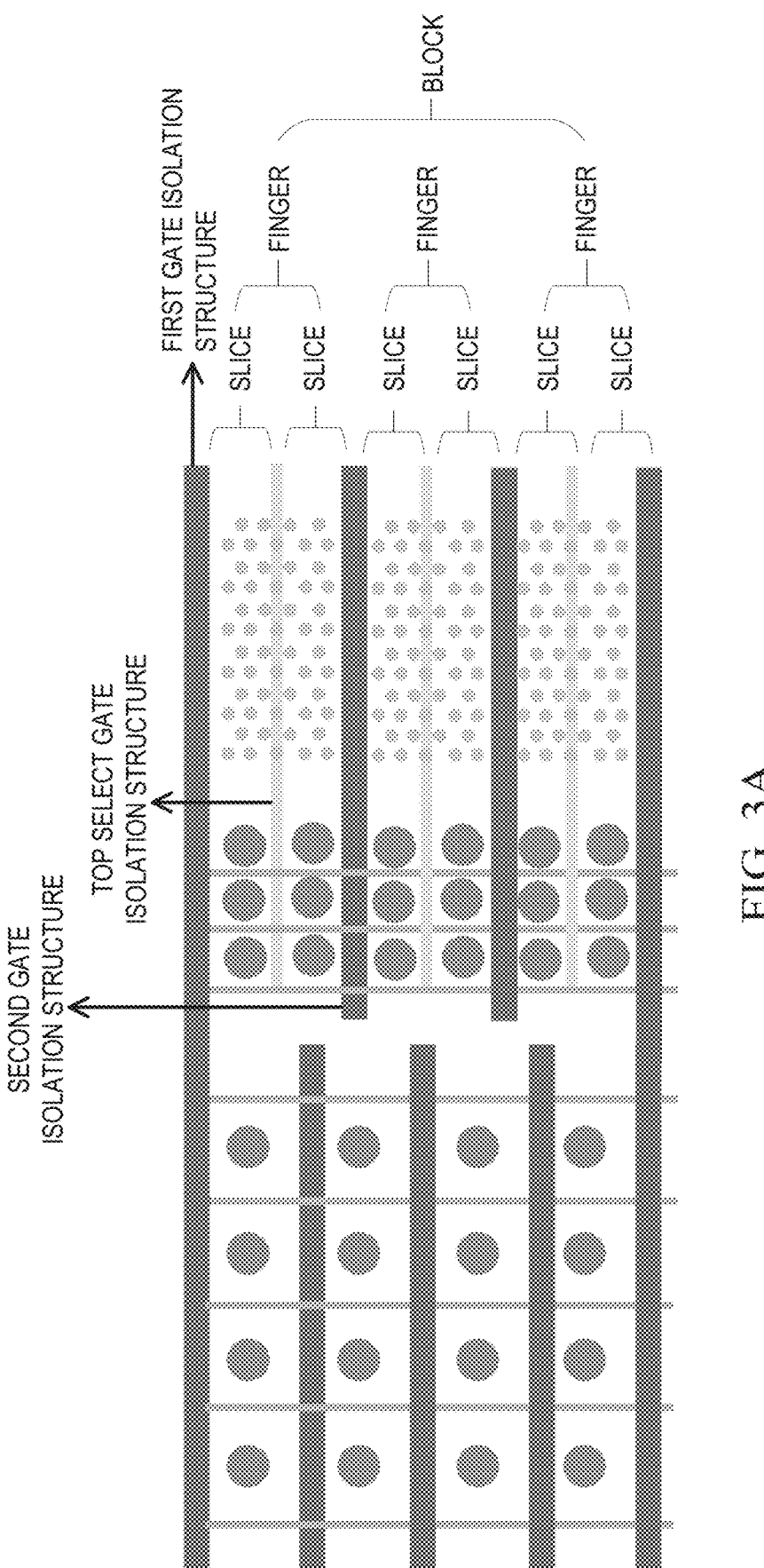
FIG. 3A is a schematic diagram of the distribution of memory cells of a three-dimensional NAND memory according to an example of the present disclosure.

FIG. 3A in an example provides a schematic structure diagram of a memory cell array of a three-dimensional NAND memory, and as shown in FIG. 3A, the memory cell array of the three-dimensional NAND memory is comprised of several rows of memory cell rows parallel to the gate isolation structure and staggered in parallel, every several memory cell rows are separated by a gate isolation structure and a top select gate isolation structure, and each memory cell row includes a plurality of memory cells. The gate isolation structure may include a first gate isolation structure and a second gate isolation structure, the first gate isolation structure divides the memory cell array into a plurality of blocks, and a plurality of second gate isolation structures divides a block into a plurality of fingers. A top select gate isolation structure provided in each finger may divide the finger into two parts, thereby dividing the finger into two slices. A block shown in FIG. 3A includes 6 slices, and in practical disclosures, the number of slices in a block is not limited to this.

In some examples, each block may be coupled to a plurality of word lines.

It should be noted that the number of memory cell rows between the gate isolation structure and the top select gate isolation structure shown in FIG. 3A is just an example, and is not used to limit the number of memory cell rows included in a finger of the three-dimensional NAND memory in the present disclosure. In practical disclosures, the number of memory cell rows included in a finger may be adjusted according to actual conditions, such as 2, 4, 8, 16, etc.

Figure 3B:
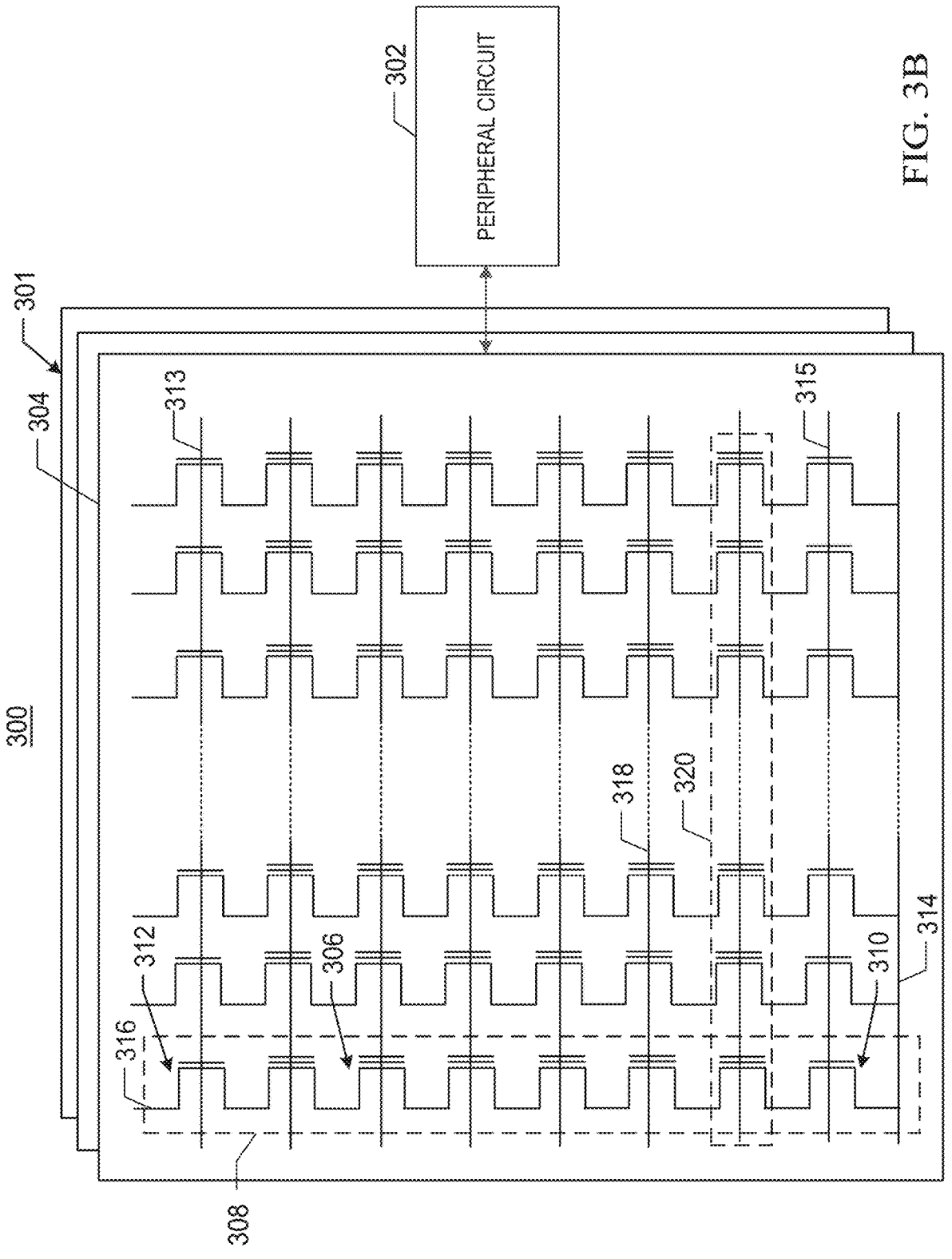
FIG. 3B is a schematic diagram of an exemplary memory including peripheral circuits according to an example of the present disclosure.

FIG. 3B illustrates a schematic circuit diagram of an exemplary memory device 300 including a peripheral circuit according to some aspects of the present disclosure. Memory device 300 may be an example of memory device 104 in FIG. 1. The memory device 300 may include a memory cell array 301 and a peripheral circuit 302 coupled to the memory cell array 301. Taking memory cell array 301 being a three-dimensional NAND memory cell array as an example for illustration, memory cells 306 is a NAND-type memory cell, and memory cells 306 are provided in the form of an array of memory strings 308, with each memory string 308 extending vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible storage states and may thus store one bit of data. For example, a first storage state of "0" may correspond to a first voltage range, and a second storage state of "1" may correspond to a second voltage range. In some implementations, each memory cell 306 is a Multi-Level Cell (MLC) capable of storing more than a bit of data in more than four storage states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programmed levels from the erased state through writing one of three possible nominal storage values into the cell, and a fourth nominal storage value may be used for the erased state.

As shown in FIG. 3B, each memory string 308 may include a bottom select transistor 310 (also referred to as a source side select transistor, which includes a source select gate BSG) at its source terminal and a top select transistor 312 (also referred to as a drain side select transistor, which includes a drain select gate TSG) at its drain terminal. The bottom select transistor BSG 310 and the top select transistor TSG 312 may be configured to activate the selected memory string 308 during read operation and program operation. In some implementations, the sources of memory strings 308 in a same block 304 are coupled through a same source line (SL) 314 (e.g., a common SL). In other words, according to some implementations, all memory strings 308 in a same block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through applying a select voltage (e.g., above the threshold voltage of a transistor with a TSG 312) or a deselect voltage (e.g., 0V) to the corresponding TSG 312 via one or more TSG lines 313 and/or applying a select voltage (e.g., above the threshold voltage of a transistor with a BSG 310) or a deselect voltage (e.g., 0V) to the corresponding BSG 310 via one or more BSG lines 315.

As also shown in FIG. 3B, a memory string 308 may be organized into a plurality of blocks 304 each of which may have a common source line 314 (e.g., coupled to ground). In some implementations, each block 304 is the basic data unit for an erase operation, e.g., all memory cells 306 on the same block 304 are erased simultaneously. To erase the memory cell 306 in the selected block 304, the source line 314 coupled to the selected block 304 and to the unselected blocks 304 in the same plane as the selected block 304 may be biased with an erase voltage (Vers) (e.g., a high positive voltage (e.g., 20V or higher)). It should be understood that, in some examples, erase operations may be performed at the half-block level, at the quarter-block level, or at a level with any suitable number of blocks or any suitable fraction of blocks. The memory cells 306 of adjacent memory strings 308 may be coupled through a word line 318 that selects which row of memory cells 306 is affected by read and program operations. In some implementations, combined with the above FIG. 3A, a plurality of memory cells are isolated by a top select gate isolation structure and a gate isolation structure, and a plurality of memory cells between the top select gate isolation structure and the gate isolation structure are arranged into a plurality of memory cell rows, and each memory cell row is parallel to the gate isolation structure and the top select gate isolation structure.

Referring to FIGS. 3A and 3B, each memory cell 306 of the plurality of memory cells is coupled to a corresponding word line 318, and each memory string 308 is coupled to a corresponding bit line 316 through a corresponding select transistor (e.g., top select transistor (TSG) 312).

Figure 4:
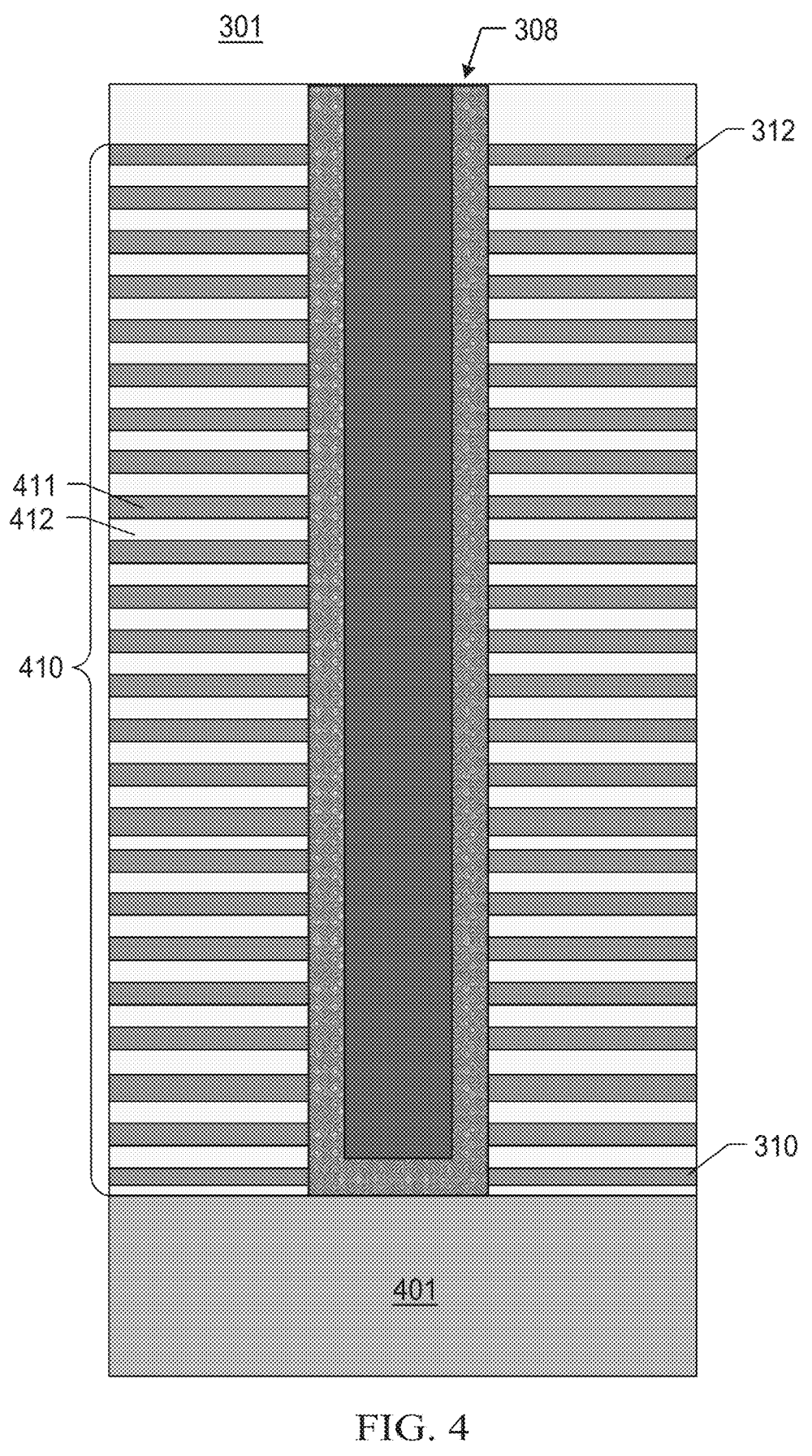

FIG. 4 illustrates a schematic cross-sectional view of an exemplary memory cell array 301 including memory strings 308, e.g., NAND, according to some aspects of the present disclosure. As shown in FIG. 4, the memory cell array 301 may include a stacked structure 410, the stacked structure 410 includes a plurality of gate layers 411 and a plurality of insulating layers 412 alternately stacked in sequence, and the channel structure vertically penetrating through the gate layers 411 and the insulating layers 412, wherein the channel structure is coupled to each gate layer to form a memory cell, and the channel structure is coupled to a plurality of gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as a top select gate line, a gate layer 411 at the bottom of a stacked structure 410 may extend laterally as a bottom select gate line, and a gate layer 411 extending laterally between a top select gate line and a bottom select gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with one or more semiconductor material(s) (e.g., as a semiconductor channel) and one or more dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A blocking layer may include silicon oxide, silicon oxynitride, a high-dielectric-constant (high-k) dielectric, or any combination thereof. In an example, a memory film may include a composite layer of silicon oxide/silicon oxynitride/silicon oxide (ONO).

Figure 5:
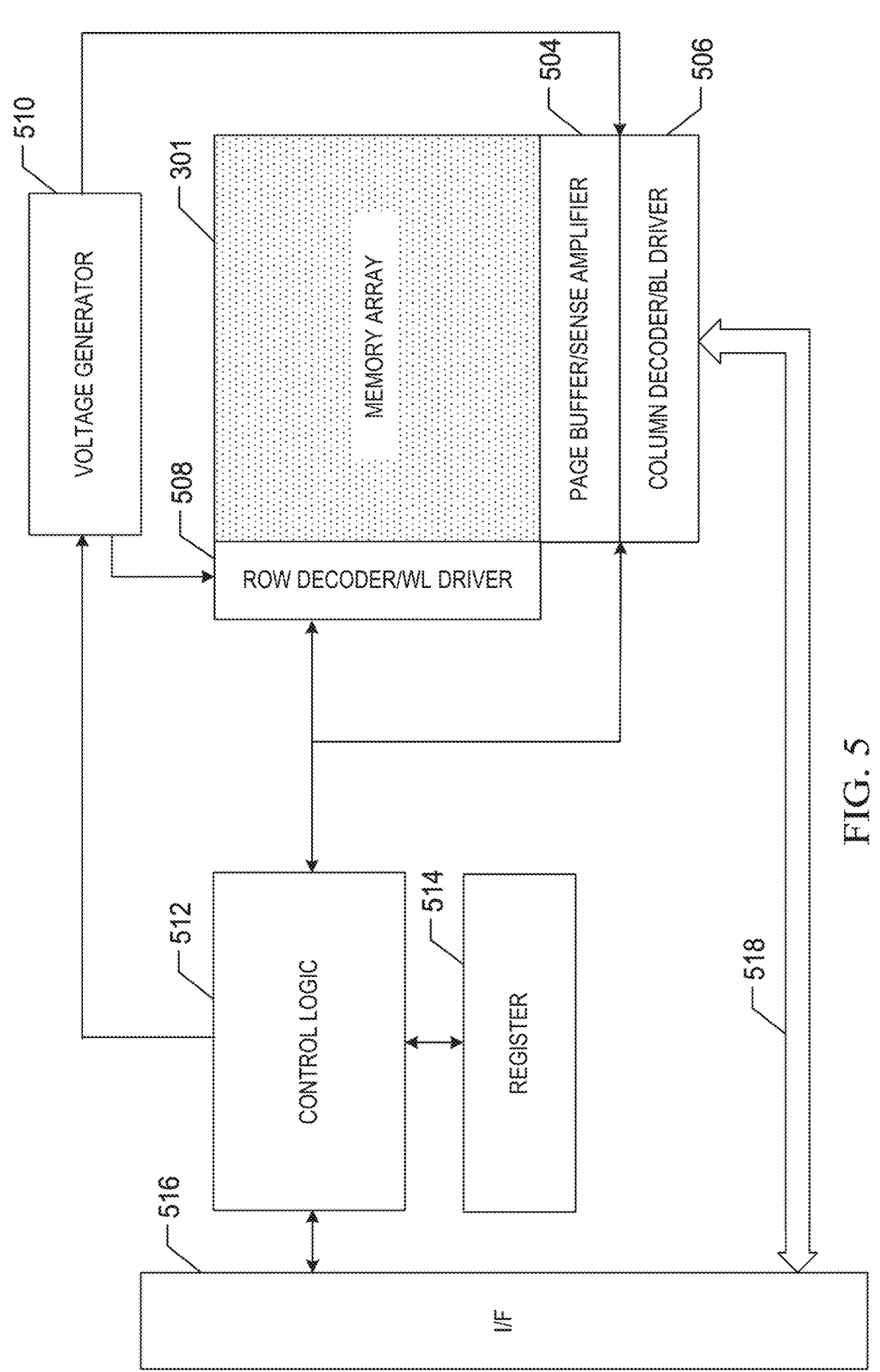
FIG. 5 is a schematic diagram of an exemplary memory device including a memory cell array and peripheral circuits according to an example of the present disclosure.

Referring back to FIG. 3B, the peripheral circuit 302 may be coupled to the memory cell array 301 through bit line 316, word line 318, source line 314, BSG line 315, and TSG line 313. The peripheral circuit 302 may include any suitable analog, digital, and mixed-signal circuit for facilitating operations of the memory cell array 301 through applying a voltage signal and/or a current signal to each target memory cell 306 and sensing voltage signal and/or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some exemplary peripheral circuits. The peripheral circuit 302 includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the memory cell array 301 according to control signals from the control logic 512. In one example, the page buffer/sense amplifier 504 may store programming data (written data) to be programmed into the memory cell array 301. In another example, page buffer/sense amplifier 504 may perform a programming verify operation to ensure that data has been correctly programmed into memory cell 306 coupled to selected word line 318. In yet another example, page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by the control logic 512 and to select one or more memory strings 308 through applying a bit line voltage generated from voltage generator 510.

The row decoder/word line driver 508 may be configured to be controlled by control logic 512 and select/deselect block 304 of memory cell array 301 and select/deselect word line 318 of block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to one or more selected word line(s) 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the memory cell array 301.

The control logic 512 may be coupled to each of other portions of the peripheral circuit described above, and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface 516 may be coupled to control logic 512 and act as a control buffer to buffer and relay control commands received from a host system (not shown) to control logic 512 and to buffer and relay status information received from the control logic 512 to the host system. Interface 516 may also be coupled to column decoder/bit line driver 506 via data bus 518 and act as a data I/O interface and data buffer to buffer and relay data to/from memory cell array 301.

As described above, in a NAND memory, a Single-level Cell (SLC) has fast read and write speed, high reliability, and long service life, but small storage capacity and a Multi-Level Cell (MLC, TLC, QLC, PLC) has large storage capacity and low cost, but slow read and write speed. In other words, when a Single-level Cell (SLC) and a Multi-Level Cell (MLC, TLC, QLC, PLC) perform read operations respectively, the read performance disparity between the two is large, e.g., there is a large disparity in read access performance of memory system for the two; wherein when the memory system reads data in a single-level cell, read speed is fast, read time is short, and data access performance is high; in contrast, when the memory system reads data in a multi-level cell, read speed is slow, read time is long, data access performance is low, and user experience is poor.

Considering that a block of a memory device in SLC mode is faster to read and write and more durable, some blocks in a memory device with multi-level cells such as MLC, TLC, QLC or PLC are configured to be accessed in SLC mode as a buffer (may be referred to as SLC cache) for buffering data. When the memory device starts writing data, the data may be written into the SLC cache first, then, when the space configured as the SLC cache is full or about to be full, the data in the SLC cache needs to be moved to the MLC, TLC, QLC or PLC to release the SLC cache space. It should be noted that the process of moving data in the SLC cache to the MLC, TLC, QLC or PLC may also be referred to as a flush operation or a flush behavior.

Figure 6:
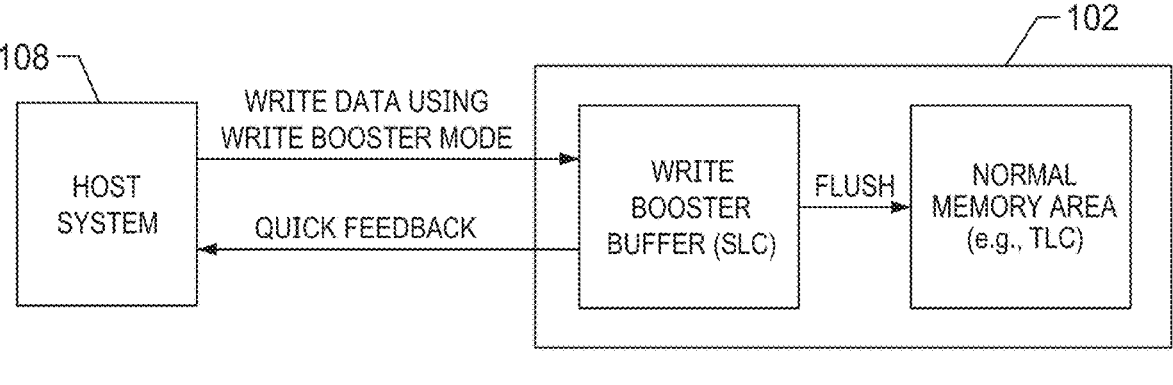
FIG. 6 is a schematic diagram of a functional implementation of a write booster provided by an example of the present disclosure.

Write Booster is a new function introduced in the UFS2.2 and UFS3.1 specifications, which improves the write performance of UFS through the aforementioned SLC cache writing method, and the function of the Write Booster is shown in FIG. 6. UFS Write Booster is widely used in current electronic apparatuses (e.g., a mobile phone), which provides the host system with the opportunity to configure the Write Boost size and control flush behavior, but currently different vendors understand this feature differently and therefore have different drive program designs. This would cause the design of firmware (FW) unable to adapt to different types of drive logic. Since the drive program can only change the flush behavior when the memory system enters an idle state, the memory system has no opportunity to control the flush behavior when the memory system Input/Output (I/O) is severely overloaded. Moreover, the Flush granularity in some examples is very small, e.g., the size of A SLC VB. Frequent flush behaviors not only affect the Write Amplification Factor (WAF), but also affect power consumption.

Based on one or more of the problems described above, examples of the present disclosure provide a memory system, electronic apparatus and operating method thereof, host system, and storage medium. The memory system includes: a memory device, including a first memory area and a second memory area, wherein the first memory area includes a plurality of first memory cells employing a single-level mode to store data, and the second memory area includes a plurality of second memory cells employing a multi-level mode to store data; and a memory controller coupled to the memory device and configured to: based on the current storage space of the first memory area and at least one adjustment threshold, transfer the data stored in the first memory area to the second memory area according to a preset transfer mode.

Figure 7:
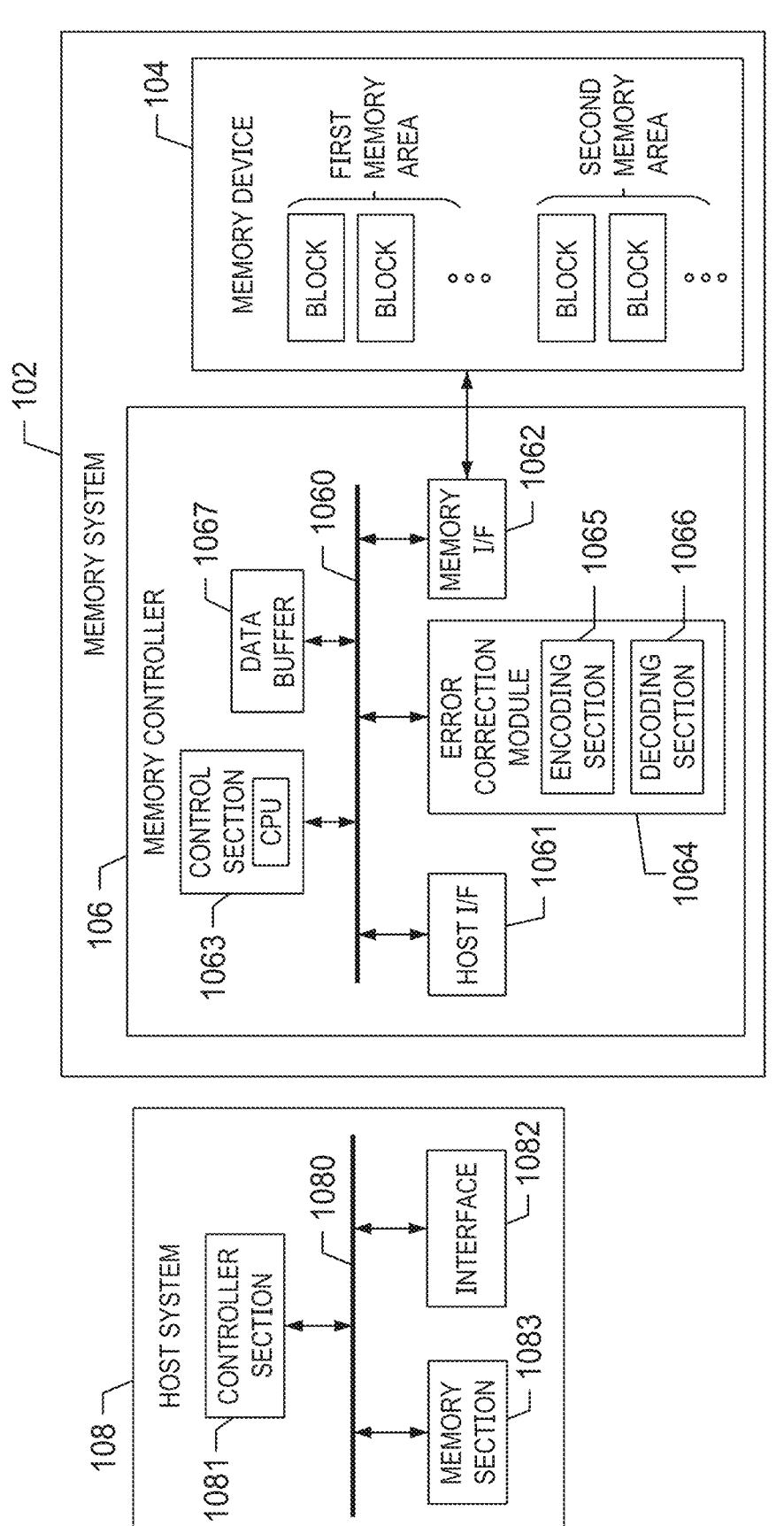
FIG. 7 is a schematic diagram of the structure of an electronic apparatus provided by an example of the present disclosure.

FIG. 7 illustrates a schematic structural diagram of an electronic apparatus. As shown in FIG. 7, the electronic apparatus includes a host system 108 and a memory system 102; the memory system 102 is connected to the host system 108, and the host system 102 may be an electronic apparatus such as a personal computer or a mobile terminal. Wherein the host system 108 may include a controller section 1081, an interface 1082 and a memory section 1083; the controller section 1081 is configured to implement various calculations, control, etc.; the interface 1082 is configured to implement instruction interaction for communication between the host system 108 and the memory system 102; the memory section 1083 is configured to implement the storage of various intermediate variables, global variables, etc., and the various components of the host system are coupled together through the first bus 1080. The first bus 1080 is configured to implement connection communication between these components. In addition to the data bus, the first bus 1080 may also include a power bus, a control bus and a status signal bus. However, for the sake of clear explanation, various buses are labeled as first bus 1080 in FIG. 7.

The memory system 102 may include: a memory controller 106 and a memory device 104, wherein the memory controller 106 is configured to control the memory device 104 to perform operations such as read, write, and erase, and the memory controller 106 and the memory device 104 may also be coupled in any suitable manner. The memory controller 106 may include a host interface (I/F) 1061, a memory interface (I/F) 1062, a control section 1063, an error correction module 1064, a data buffer 1067, and a second bus 1060. The host interface 1061 is a connection interface between the host system 108 and the memory controller 106. The host interface 1061 allows the host and the memory controller to communicate according to an example protocol, to send read request and write request, and to perform other operations. The memory interface 1062 is a connection interface between the memory controller 106 and the memory device 104. The memory interface 1062 is configured to implement data transmission between the memory controller 106 and the memory device 104. The control section 1063 is configured to control the memory controller 106 as a whole. In some examples, the control section 1063 is, e.g., a central processing unit (CPU), a microprocessor (MCU), etc. The error correction module 1064 may further include an encoding section 1065 and a decoding section 1066; the encoding section 1065 is configured to encode the data to be stored to obtain check data, and the decoding section 1066 is configured to decode the check data to detect and correct possible erroneous data during data transmission. The data buffer 1067 is configured to buffer data.

The memory device 104 may include a plurality of blocks 1041, and the plurality of blocks 1041 may be divided into a first memory area and a second memory area. The first memory area includes a plurality of first memory cells, and the second memory area includes a plurality of second memory cells; wherein the number of bits stored in the first memory cell is less than the number of bits stored in the second memory cell, e.g., the used storage capacity of the first memory cell is less than the used storage capacity of the second memory cell. In other words, the first memory area includes a plurality of first memory cells employing a single-level mode to store data, and the second memory area includes a plurality of second memory cells employing a multi-level mode to store data. It may be understood that the read speed and write speed of the first memory cell is greater than the read speed and write speed of the second memory cell. In an example, the first memory cells in the first memory area are configured as Single-level Cell (SLC) by Multi-Level Cell, and the second memory cells in the second memory area remain as ordinary Multi-Level Cells (e.g., MLC, TLC, QLC, PLC, etc.).

Here, the current storage space of the first memory area may be understood as the total storage space of the first memory area minus the space already used to store data. The number of adjustment thresholds may include one or more, and the one or more adjustment thresholds may be used as trigger boundaries for different transfer modes. Different transfer modes correspond to different transfer frequencies and/or transfer data amount.

In some examples, the at least one adjustment threshold includes a plurality of adjustment thresholds; and the memory controller is configured to: based on the magnitude relationship between the proportion of the current storage space of the first memory area to the total space and the plurality of adjustment thresholds, determine a transfer mode for transferring data stored in the first memory area to the second memory area, different transfer modes corresponding to different transfer frequencies and/or transfer data amount.

Here, the plurality of adjustment thresholds may be percentages. The proportion of the current storage space in the first memory area to the total space is calculated, the magnitude relationship between the proportion and a plurality of adjustment thresholds is compared, and the transfer mode according to the comparison result is determined.

In some examples, the plurality of adjustment thresholds include a first adjustment threshold corresponding to a first proportion, a second adjustment threshold corresponding to a second proportion and a third adjustment threshold corresponding to a third proportion, the first proportion is less than the second proportion, and the second proportion is less than the third proportion; the memory controller is configured to: when the proportion of the current storage space of the first memory area to the total space is less than or equal to the first proportion, transfer at least part of the data stored in the first memory area to the second memory area according to a first frequency using a first transfer mode; when the proportion of the current storage space of the first memory area to the total space is greater than the first proportion and less than the second proportion, transfer part of the data stored in the first memory area to the second memory area according to a second frequency using a second transfer mode; when the proportion of the current storage space of the first memory area to the total space is greater than the third proportion, transfer at most part of the data stored in the first memory area to the second memory area according to a third frequency using a third transfer mode; wherein, the first frequency corresponding to the first transfer mode is greater than the second frequency corresponding to the second transfer mode, and the second frequency corresponding to the second transfer mode is greater than the third frequency corresponding to the third transfer mode.

Here, the magnitude relationship between the first proportion, the second proportion and the third proportion is: first proportion<second proportion<third proportion, and the values of the first proportion, the second proportion and the third proportion may be adjusted according to the actual situation. In some examples, the first proportion ranges from 20% to 40%, the second proportion ranges from 60% to 80%, and the third proportion ranges from 90% to 100%. For example, the first proportion is 30%, the second proportion is 70%, and the third proportion is 90%.

It may be understood that the first transfer mode corresponds to the proportion of the current storage space of the first memory area to the total space being less than or equal to the first proportion, that is, the current storage space of the first memory area has shown to be insufficient. At this point, the first frequency and/or the transfer data amount corresponding to the first transfer mode is relatively large. The second transfer mode corresponds to the proportion of the current storage space of the first memory area to the total space being greater than the first proportion and less than the second proportion, that is, the current storage space usage of the first memory area is relatively normal At this point, the second frequency and/or the transfer data amount corresponding to the first transfer mode are performed normally. The third transfer mode corresponds to the proportion of the current storage space of the first memory area to the total space being greater than the third proportion, that is, the current storage space of the first memory area is relatively abundant. At this point, the third frequency and/or the transfer data amount corresponding to the third transfer mode are both relatively small, or even 0.

It should be noted that when the proportion of the current storage space in the first memory area to the total space is greater than the second proportion and less than the third proportion, the second transfer mode may also be further subdivided, that is, the transfer frequency and/or data transfer amount of the second transfer mode is subdivided. In an example, the data transfer amount corresponding to the proportion of the current storage space of the first memory area to the total space being greater than the first proportion and less than the second proportion is set to be greater than a value greater than the second proportion and less than the third proportion.

In some examples, the first transfer mode is to continue data transfer when the storage memory system is in an idle state until all data is transferred or the storage memory system exits the idle state; the second transfer mode is to transfer part of the data amount when the storage memory system is in an idle state; and the third transfer mode is to stop data transfer.

It should be noted that the transfer of data from the first memory area to the second memory area (flush operation) in the present disclosure is implemented when the memory system is in an idle state. Generally, the memory system enters the idle state after a period of time in which there is no host system access request, however, at this point, some operations to improve storage performance may still be performed between the memory controller and the memory device within the memory system, e.g., bad block management, garbage collection and wear leveling, etc.

Here, the first transfer mode may also be referred to as a forced flush mode. In this mode, once the memory system enters the idle state, it starts to perform the flush operation (e.g., transfer of the data in the first memory area to the second memory area) until the memory system exits the idle state or the data execution of the flush operation is completed, e.g., all data in the first memory area has been transferred to the second memory area.

Here, the second transfer mode may also be referred to as fragmented flush mode. In this mode, after the memory system enters the idle state, it starts to perform the flush operation, and when the flush operation reaches the preset data amount, the memory system remains in the idle state but does not perform the flush operation. The preset data amount here may be adjusted according to actual conditions. For example, every time the memory system enters the idle state, 30% of the current total data amount in the first memory area is flushed and transferred to the second memory area.

Here, the third transfer mode may also be referred to as the stop flush mode. In this mode, after the memory system enters the idle state, it does not perform a flush operation and remains in the idle state to save power.

Figure 8:
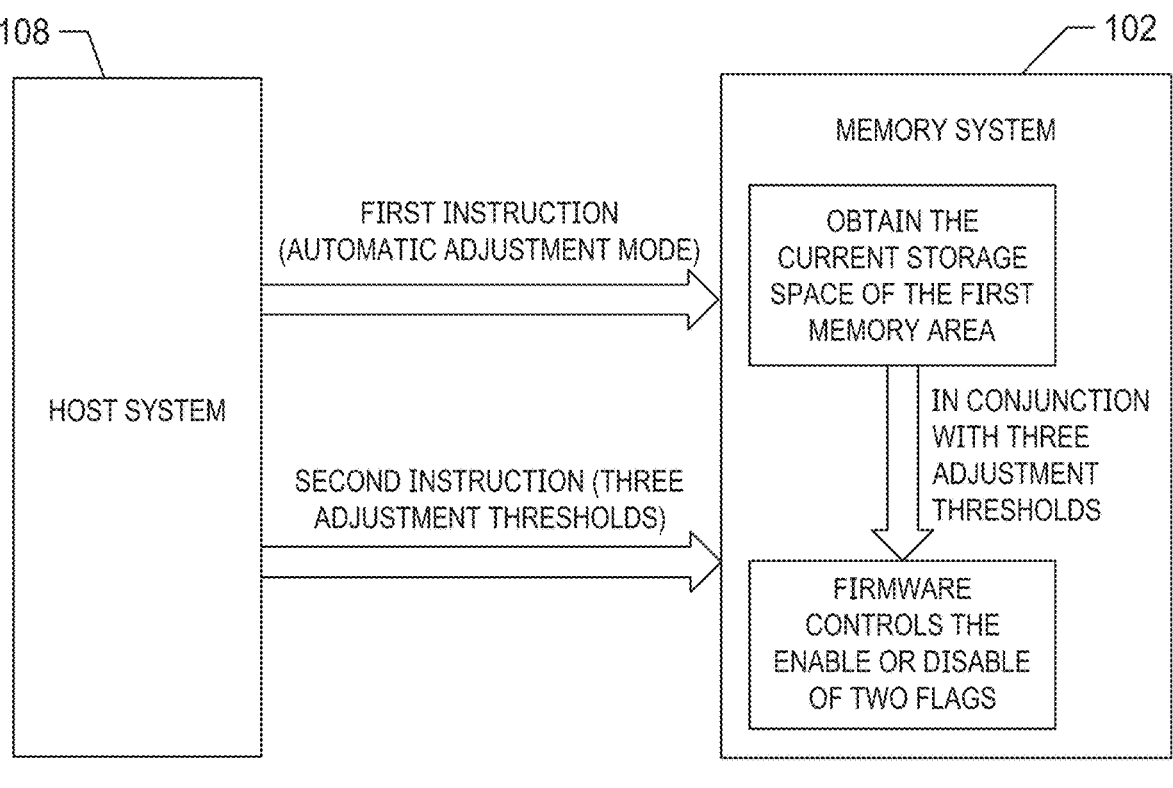
FIG. 8 is a schematic diagram of the interaction process between the host system and the memory system provided by an example of the present disclosure.

In some examples, as shown in FIG. 8, the host system may send the adjustment thresholds (e.g., three adjustment thresholds) to the memory system in the form of instructions. Two flags are set in the firmware of the memory system, and these two flags may respectively correspond to the aforementioned forced flush mode and fragmented flush mode. When the current storage space of the first memory area satisfies the forced flush mode as compared to the adjustment threshold, the flag corresponding to the forced flush mode is enabled and the forced flush mode is started; when the current storage space of the first memory area satisfies the fragmented flush mode as compared to the adjustment threshold, the flag corresponding to the fragmented flush mode is enabled and the fragmented flush mode is started; and when the current storage space of the first memory area satisfies the stop flush mode as compared to the adjustment threshold, the flags corresponding to the forced flush mode and the fragmented flush mode are disabled and the stop flush mode is started.

In some examples, at least one adjustment threshold includes two adjustment thresholds, and in this case, the division of the corresponding transfer modes may be relatively simple. In some examples, the proportion ranges corresponding to the two adjustment thresholds are 60%-80% and 20%-40%, and in an example 70% and 30%, and the corresponding transfer mode may be the aforementioned fragmented flush mode and stop flush mode. When the current storage space of the first memory area is greater than or equal to 70%, the fragmented flush mode is enabled; and when the current storage space of the first memory area is less than 30%, the stop flush mode is enabled.

In some examples, at least one adjustment threshold includes one adjustment threshold. In this case, the division of the corresponding transfer modes may be relatively simple. In some examples, the proportion range corresponding to the one adjustment thresholds is 50-70%, and in an example is 60%, and the corresponding transfer mode may be the aforementioned fragmented flush mode and stop flush mode. When the current storage space of the first memory area is greater than or equal to 60%, the fragmented flush mode is enabled; and when the current storage space of the first memory area is less than 60%, the stop flush mode is enabled.

It may be understood that, for the memory system side, one or more adjustment thresholds may be obtained through instructions or other ways, and at the same time, the proportion of the current storage space of the first memory area to the total space is periodically obtained. This proportion is compared with one or more adjustment thresholds obtained previously, and it is determined to enable or disable flags corresponding to different transfer modes based on the comparison results, thereby implementing adjustment of different transfer modes.

It should be noted that in the examples of the present disclosure, corresponding adjustment threshold and transfer mode may be set according to requirements, and the above are only some examples and are not used to limit the adjustment thresholds and transfer modes in the examples of the present disclosure. It is understandable that the more the adjustment threshold is set, the more complicated the setting of the corresponding transfer mode will be.

The aforementioned memory system determining and switching the adjustment mode on its own based on the magnitude relationship between the current storage space of the first memory area and the adjustment threshold may be referred to as an automatic flush mode or an automatic adjustment mode. The memory system switching the adjustment mode based on the specified adjustment mode sent by the host system may be referred to as a passive flush mode or a passive adjustment mode. In some examples, the automatic flush mode and the passive flush mode may be switched through instructions or other ways to obtain good compatibility.

In some examples, the memory controller is configured to: receive a first instruction, the first instruction instructing the storage memory system to enter the automatic adjustment mode; in response to the first instruction, receive a second instruction, the second instruction including the at least one adjustment threshold; and obtain a current storage space of the first memory area based on a preset period.

In some examples, the memory controller is further configured to: receive a third instruction, the third instruction instructing the storage memory system to enter the passive adjustment mode; after the third instruction, receive a fourth instruction, the fourth instruction instructs to transfer data stored in the first memory area to the second memory area based on the specified transfer mode; and in response to the fourth instruction, transfer data stored in the first memory area to the second memory area based on the specified transfer mode.

Here, the first instruction instructs the storage memory system to enter the automatic adjustment mode, while the second instruction is used to pass one or more adjustment thresholds from the host system to the memory system. The third instruction instructs the storage memory system to enter the passive adjustment mode, meanwhile the fourth instruction is used to pass the specified transfer mode to the storage memory system. The memory system directly transfers the data in the first memory area to the second memory area based on the transfer mode specified by the host system.

Here, obtaining the current storage space of the first memory area according to the preset period may be understood as adjusting the transfer mode according to the preset period. That is to say, the switching of the transfer mode is adjusted according to the preset period. In some examples, the preset period here may include 100 ms-2 s, for example 1 s.

In other examples, every time the memory system enters the idle state, the current storage space is obtained and the transfer mode is switched.

It may be understood that switching the transfer mode according to the preset period may avoid too frequent transfer mode modifications and small flush granularity caused by the memory system entering the idle state too frequently (e.g., 10 ms); switching the transfer mode according to the preset period may avoid the case that memory system has no opportunity to change the flush mode or the lag of changing the flush mode due to the memory system having heavy traffic on the input and output interfaces and having no opportunity or taking too long (e.g., 3 s) to enter the idle state, which will cause the read speed and write speed of the memory device to slow down when the current storage space of the first storage space is insufficient.

In some examples, the memory controller is configured to: control the memory device to read the data stored in the first memory area according to a preset transfer mode, and write the read data into the second memory area.

In some examples, when the data stored in the first memory area is transferred to the second memory area, the data reversal may be implemented inside the memory device. In an example, it may be implemented through the Copyback Read instruction and the Copyback Program instruction.

In some examples, when the data stored in the first memory area is transferred to the second memory area, the data reversal may be implemented between the memory device and the memory controller. In an example, the data stored in the first memory area in the memory device may be fed back to the memory controller after the read operation, and then written from the memory controller to the second memory area in the memory device.

An example of the present disclosure further provides a host system, including: a memory section; an interface; a controller section configured to send a first instruction with the interface, the first instruction instructing the memory system to enter the automatic adjustment mode; the memory system includes a memory device, the memory device including a first memory area and a second memory area, the first memory area includes a plurality of first memory cells employing a single-level mode to store data, the second memory area includes a plurality of second memory cells employing a multi-level mode to store data; after sending the first instruction, send a second instruction, the second instruction including at least one adjustment threshold, the at least one adjustment threshold and the current storage space of the first memory area provide a basis for a transfer mode of transferring at least part of the data stored in the first memory area to the second memory area.

In some examples, the controller section is further configured to: send a third instruction, the third instruction instructing the storage memory system to enter a passive adjustment mode; after sending the third instruction, send a fourth instruction, wherein the fourth instruction instructs to transfer data stored in the first memory area to the second memory area based on the specified transfer mode.

Here, for the host system side, the drive program may be modified to skip all the flush checks for the first memory area in the drive program code with no need to modify a large amount of code about the flush operation, and only two flag protocols may be added, to implement the flush adjustment of different transfer modes.

An example of the present disclosure further provides an electronic apparatus including a host system and a memory system coupled to the host system; wherein, the memory system includes a memory device, the memory device including a first memory area and a second memory area, the first memory area includes a plurality of first memory cells employing a single-level mode to store data, the second memory area includes a plurality of second memory cells employing a multi-level mode to store data; the host system is configured to send a first instruction; the memory system is configured to receive the first instruction and enter an automatic adjustment mode in response to the first instruction; the host system is further configured to send a second instruction after the first instruction, the second instruction including at least one adjustment threshold; the memory system is further configured to: receive the second instruction; obtain the current storage space of the first memory area; based on the current storage space of the first memory area and the at least one adjustment threshold, transfer data stored in the first memory area to the second memory area based on a preset mode.

Figures 9A, 9B:
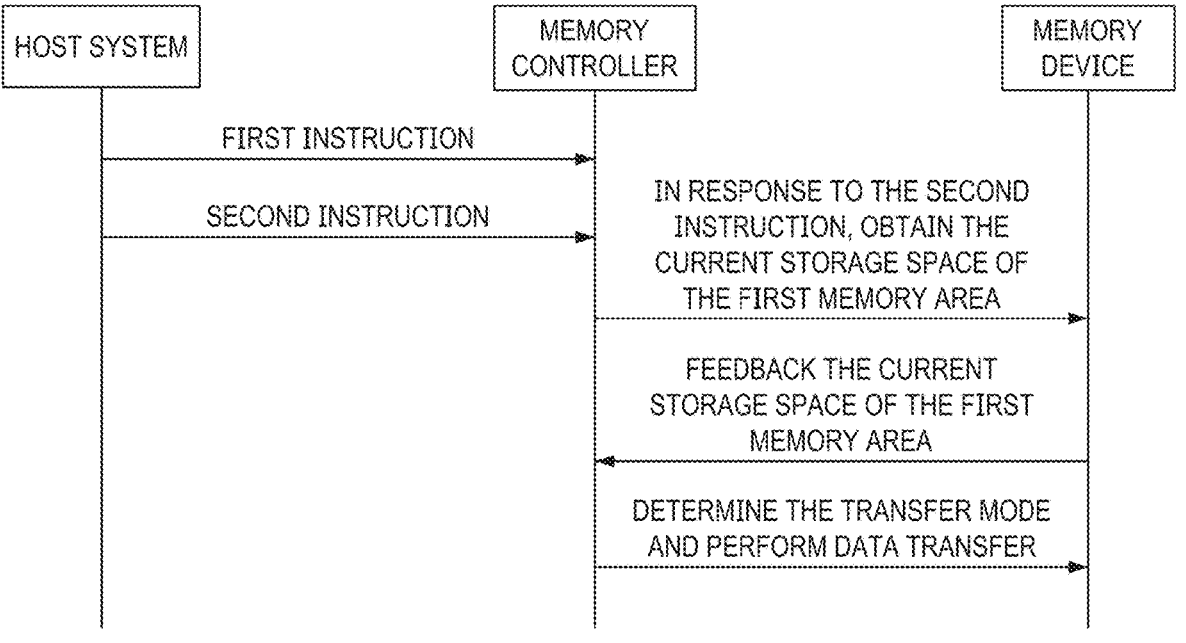
FIG. 9A is a schematic diagram of instruction interaction in an electronic apparatus provided by an example of the present disclosure.
FIG. 9B is a schematic diagram of instruction interaction in another electronic apparatus provided by an example of the present disclosure.

Here, the memory system determines and switches the adjustment mode on its own based on the magnitude relationship between the current storage space of the first memory area and the adjustment threshold. In an example, as shown in FIG. 9A, the host system notifies the memory system to enter the automatic adjustment mode through the first instruction, and sends one or more adjustment thresholds to the memory system through the second instruction, wherein the memory controller in the memory system periodically obtains the current storage space of the first memory area of the memory device, compares the current storage space of the first memory area with one or more adjustment thresholds after each time the memory device feeds back the current storage space of the first memory area, determines the current transfer mode according to the comparison result, and controls the memory device to transfer data based on the current transfer mode.

In some examples, the host system is further configured to: send a third instruction; the memory system is further configured to receive the third instruction and enter an passive adjustment mode in response to the third instruction; the host system is further configured to send a fourth instruction after sending the third instruction; the memory system is further configured to: in response to the fourth instruction, transfer data stored in the first memory area to the second memory area based on the specified transfer mode.

Here, the memory system switches the adjustment mode based on the specified adjustment mode sent by the host system. In an example, as shown in FIG. 9B, the host system notifies the memory system to enter the passive adjustment mode through the third instruction, and sends the specified transfer mode to the memory system through the fourth instruction. The memory controller in the memory system controls the memory device to perform data transfer based on the current transfer mode.

An example of the present disclosure further provides an electronic apparatus including a host system and a memory system coupled to the host system; wherein, the memory system includes a memory device, the memory device including a first memory area and a second memory area, wherein the first memory area includes a plurality of first memory cells employing a single-level mode to store data, and the second memory area includes a plurality of second memory cells employing a multi-level mode to store data; the host system is configured to send a fifth instruction; the memory system is configured to receive the fifth instruction and feed back a current storage space of the first memory area in response to the fifth instruction; the host system is further configured to: receive the current storage space of the first memory area and obtain at least one adjustment threshold; based on the current storage space of the first memory area and the at least one adjustment threshold, determine a transfer mode for transferring at least part of the data stored in the first memory area to the second memory area; and send a sixth instruction; the memory system is configured to: receive the sixth instruction, and in response to the sixth instruction, transfer at least part of the data stored in the first memory area to the second memory area based on the determined transfer mode.

Different from the aforementioned electronic apparatus, here the execution subject corresponding to determining the adjustment mode based on the magnitude relationship between the current storage space of the first memory area and the adjustment threshold is a host system. That is to say, the memory system feeds back the current storage space of the first memory area in the memory device to the host system. The host system does not need to send the adjustment threshold to the memory system. Instead, after the host system obtains the adjustment threshold, it compares the current storage space of the first memory area with the adjustment threshold on its own, determines the transfer mode based on the comparison result, and sends the determined transfer mode to the memory system.

Figure 9C:
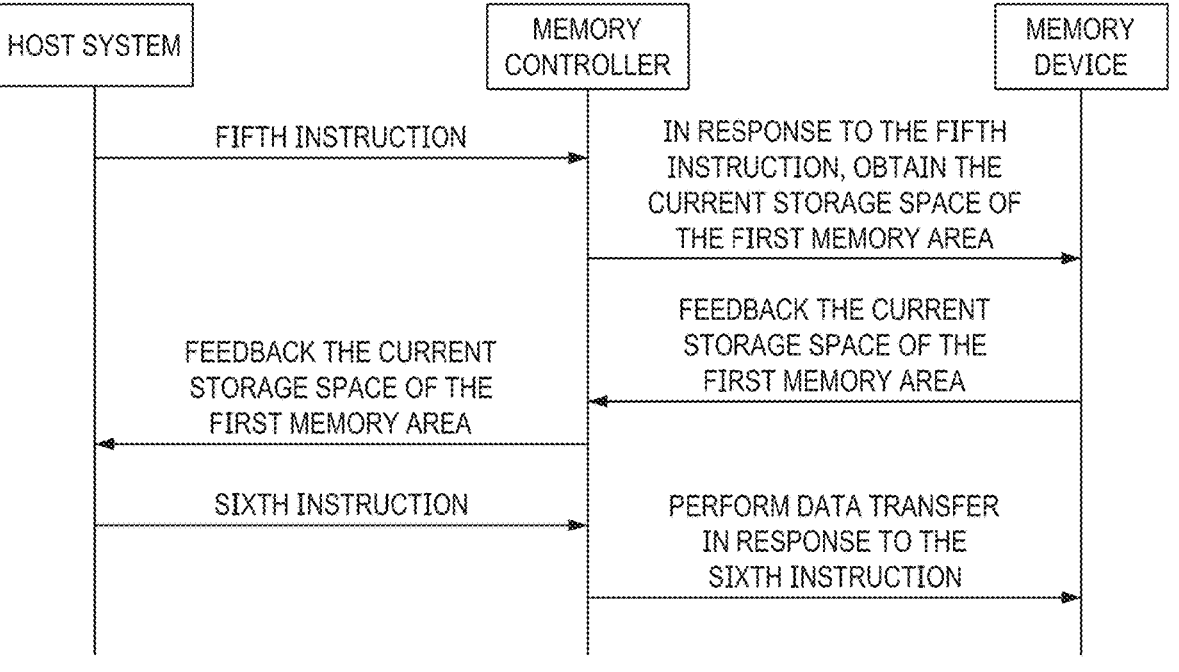
FIG. 9C is a schematic diagram of instruction interaction in still another electronic apparatus provided by an example of the present disclosure.

In an example, as shown in FIG. 9C, the host system notifies the memory system to enter the automatic adjustment mode through the fifth instruction, and the memory controller in the memory system periodically obtains the current storage space of the first memory area of the memory device in response to the fifth instruction, feeds back the current storage space of the first memory area fed back by the memory device each time to the host system, compares the current storage space of the first memory area with obtained one or more adjustment thresholds, determines the current transfer mode according to the comparison result, and sends the currently determined transfer mode to the memory controller through the sixth instruction, wherein the memory controller controls the memory device to perform data transfer based on the current transfer mode.

It may be understood that the data transfer solution of the example of the present disclosure periodically queries the current remaining space of the first memory area, and periodically switches the transfer mode. Each time querying the current remaining space of the first memory area, the data transfer solution first queries the previously saved query results, and only performs new queries on the updated local area, thereby avoiding polling the entire memory space of the first memory area every time it enters the idle state, thus reducing the polling overhead of the software.

Meanwhile, the data transfer solution of the example of the present disclosure switches the transfer mode according to the preset period, which may avoid too frequent transfer mode modifications and small flush granularity caused by the memory system entering the idle state too frequently (e.g., 10 ms), thereby increasing flush granularity and saving power consumption. Furthermore, switching the transfer mode according to the preset period may improve the problem that memory system has no opportunity to change the flush mode or the lag of changing the flush mode due to the memory system having heavy traffic on the input and output interfaces and having no opportunity or taking too long to enter the idle state, which will cause the read speed and write speed of the memory device to slow down when the current storage space of the first storage space is insufficient.

An example of the present disclosure provides an operating method of a memory system, wherein the memory system includes a memory device, the memory device including a first memory area and a second memory area. The first memory area includes a plurality of first memory cells employing a single-level mode to store data, and the second memory area includes a plurality of second memory cells employing a multi-level mode to store data. The operating method includes: based on the current storage space of the first memory area and the at least one adjustment threshold, transferring the data stored in the first memory area to the second memory area according to a preset transfer mode.

In some examples, the at least one adjustment threshold includes a plurality of adjustment thresholds; based on the current storage space of the first memory area and at least one adjustment threshold, transferring at least part of the data stored in the first memory area to the second memory area according to a preset transfer frequency includes: based on the magnitude relationship between the proportion of the current storage space of the first memory area to the total space and the plurality of adjustment thresholds, determining a transfer mode for transferring data stored in the first memory area to the second memory area, different transfer modes corresponding to different transfer frequencies and/or transfer data amount.

In some examples, the plurality of adjustment thresholds include a first adjustment threshold corresponding to a first proportion, a second adjustment threshold corresponding to a second proportion and a third adjustment threshold corresponding to a third proportion. The first proportion is less than the second proportion, and the second proportion is less than the third proportion. The determining a transfer mode for transferring at least part of the data stored in the first memory area to the second memory area based on the magnitude relationship between the proportion of the current storage space of the first memory area to the total space and the plurality of adjustment thresholds including: when the proportion of the current storage space of the first memory area to the total space is less than or equal to the first proportion, transferring at least part of the data stored in the first memory area to the second memory area according to a first frequency using a first transfer mode; when the proportion of the current storage space of the first memory area to the total space is greater than the first proportion and less than the second proportion, transferring part of the data stored in the first memory area to the second memory area according to a second frequency using a second transfer mode; when the proportion of the current storage space of the first memory area to the total space is greater than the third proportion, transferring at most part of the data stored in the first memory area to the second memory area using a third transfer mode; wherein, the first frequency corresponding to the first transfer mode is greater than the second frequency corresponding to the second transfer mode, and the second frequency corresponding to the second transfer mode is greater than the third frequency corresponding to the third transfer mode.

In some examples, the method further includes: receiving a first instruction, the first instruction instructing the storage memory system to enter the automatic adjustment mode; in response to the first instruction, receive a second instruction, the second instruction including the at least one adjustment threshold; and obtain a current storage space of the first memory area based on a preset period.

In some examples, the method further includes: receiving a third instruction, the third instruction instructing the storage memory system to enter a passive adjustment mode; after the third instruction, receiving a fourth instruction, the fourth instruction instructing to transfer data stored in the first memory area to the second memory area based on the specified transfer mode; and in response to the fourth instruction, transferring data stored in the first memory area to the second memory area based on the specified transfer mode.

In some examples, the transferring at least part of the data stored in the first memory area to the second memory area according to a preset transfer mode includes: reading the data stored in the first memory area according to a preset transfer mode, and writing the read data into the second memory area.

It should be noted that the operating method of the memory system in the examples described above may be understood with reference to the example implementation of transfer mode switching described in the memory system in the previous examples.

An example of the present disclosure further provides an operating method of a host system, the host system being coupled to the memory system, and the operating method includes: sending a first instruction, the first instruction instructing the memory system to enter the automatic adjustment mode; the memory system includes a memory device, the memory device including a first memory area and a second memory area, the first memory area includes a plurality of first memory cells employing a single-level mode to store data, the second memory area includes a plurality of second memory cells employing a multi-level mode to store data; after sending the first instruction, send a second instruction, the second instruction including at least one adjustment threshold, the at least one adjustment threshold and the current storage space of the first memory area provide a basis for a transfer mode of transferring data stored in the first memory area to the second memory area.

In some examples, the method further includes: sending a third instruction, the third instruction instructing the storage memory system to enter a passive adjustment mode; after sending the third instruction, sending a fourth instruction, the fourth instruction instructing to transfer the at least part of the data stored in the first memory area to the second memory area based on the specified transfer mode.

It should be noted that the operating method of the host system in the examples described above may be understood with reference to the example implementation of transfer mode switching described in the host system in the previous examples.

Figure 10A:
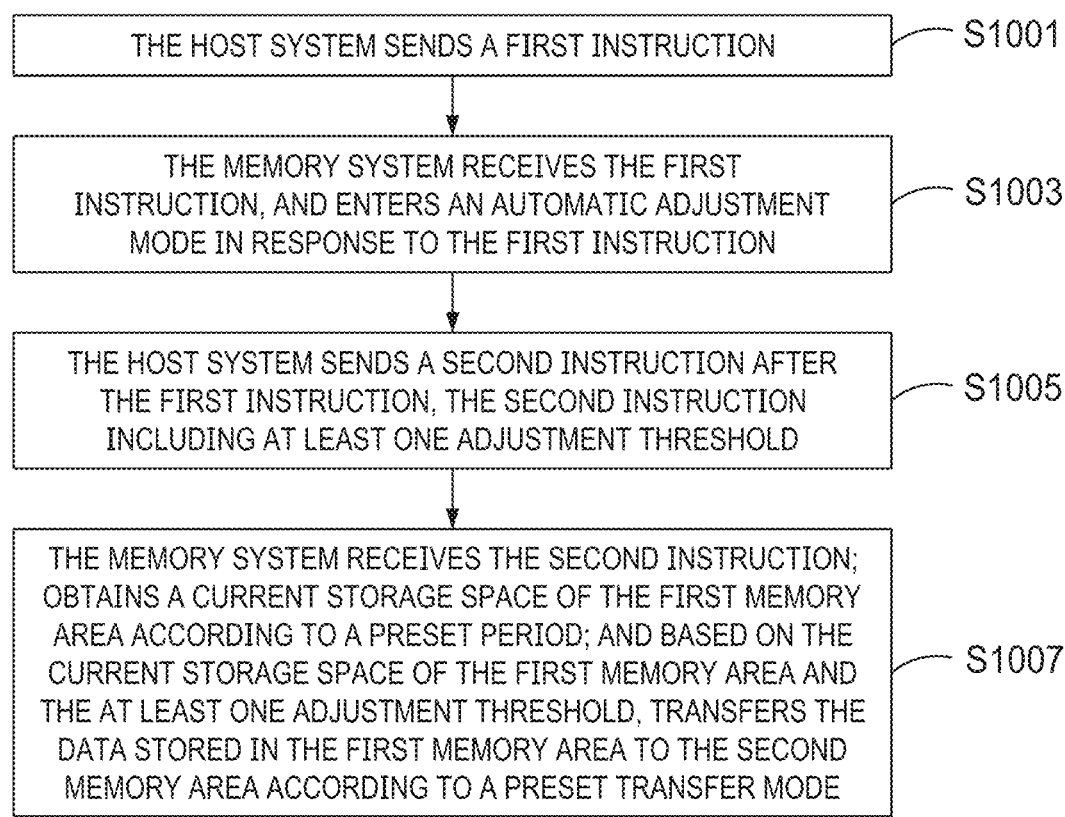
FIG. 10A is a schematic flow diagram of operations of an operating method of an electronic apparatus provided by an example of the present disclosure.

An example of the present disclosure further provides an operating method of an electronic apparatus, the electronic apparatus including a host system and a memory system coupled to the host system; wherein the memory system includes a memory device, the memory device including a first memory area and a second memory area, the first memory area includes a plurality of first memory cells employing a single-level mode to store data, and the second memory area includes a plurality of second memory cells employing a multi-level mode to store data. Referring to FIG. 7 and FIG. 10A, FIG. 9 is a schematic diagram of operations of an operating method of an electronic apparatus provided by an example of the present disclosure, wherein the operating method includes the following operations.

Operation S1001: sending, by the host system, a first instruction.

Operation S1003: receiving, by the memory system, the first instruction and entering an automatic adjustment mode in response to the first instruction.

Operation S1005: sending, by the host system, a second instruction after the first instruction, the second instruction including at least one adjustment threshold.

Operation S1007: by the memory system, receiving the second instruction; obtaining a current storage space of the first memory area based on a preset period; based on the current storage space of the first memory area and the at least one adjustment threshold, transferring the data stored in the first memory area to the second memory area according to a preset transfer mode.

In some examples, the method further includes: sending, by the host system, a third instruction; receiving, by the memory system, the third instruction and entering an passive adjustment mode in response to the third instruction; sending, by the host system, a fourth instruction after sending the third instruction; in response to the fourth instruction, transferring, by the memory system, the data stored in the first memory area to the second memory area based on the specified transfer mode.

An example of the present disclosure further provides an operating method of an electronic apparatus, the electronic apparatus including a host system and a memory system coupled to the host system; wherein the memory system includes a memory device, the memory device including a first memory area and a second memory area. The first memory area includes a plurality of first memory cells employing a single-level mode to store data, and the second memory area includes second memory cells employing a multi-level mode to store data. Referring to FIG. 7 and FIG. 10B, FIG. 10B is a schematic flow diagram of operations of another operating method of an electronic apparatus provided by an example of the present disclosure, wherein the operating method includes the following operations.

Operation S1002: sending, by the host system, a fifth instruction.

Operation S1004: by the memory system, receiving the fifth instruction and feeding back a current storage space of the first memory area in response to the fifth instruction.

Operation S1006: by the host system, receiving the current storage space of the first memory area and obtaining at least one adjustment threshold; based on the current storage space of the first memory area and the at least one adjustment threshold, determining a transfer frequency for transferring data stored in the first memory area to the second memory area; and sending a sixth instruction.

Operation S1008: by the memory system, receiving the sixth instruction, and in response to the sixth instruction, transferring the data stored in the first memory area to the second memory area based on the determined transfer mode.

An example of the present disclosure further provides a storage medium having executable instructions stored thereon, the executable instructions, when executed, may implement the operations of the methods described in the examples of the present disclosure.

In the example of the present disclosure, the read and write speed of the first memory area of the memory device in the memory system is greater than the read and write speed of the second memory area, and the memory controller in the memory system determines a transfer mode for transferring at least part of the data in the first memory area to the second memory area based on the magnitude relationship between the current storage space of the first memory and at least one adjustment threshold. In the example of the present disclosure, based on the magnitude relationship between the remaining storage space of the first memory and the adjustment threshold, the transfer mode may be flexibly adjusted, to better adapt to different disclosure scenarios, taking into account smaller power consumption and better read and write performance.

In some examples, the memory system includes a Universal Flash Storage (UFS) or a Solid State Disk (SSD). The memory device includes a NAND memory.

The present disclosure further provides a storage medium, having executable instructions stored thereon, the executable instructions, when executed by an electronic apparatus, may implement the operations of the operating method of the electronic apparatus in the examples of the present disclosure described above.

In some examples, the storage medium may be memory such as Ferromagnetic Random Access Memory (FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, Magnetic Surface Memory, Optical Disk, or Compact Disc Read-Only Memory (CD-ROM); and may also be various devices including one or any combination of the memory devices described above.

In some examples, executable instructions may take the form of a program, software, software module, script, or code, written in any form of programming language (including compiled or interpreted languages, or declarative or procedural languages), and may be deployed in any form, including as a stand-alone program or as a module, component, subroutine, or other unit suitable for use in a computing environment.

As an example, executable instructions may, but do not necessarily, correspond to, files in a file system, and may be stored as part of a file holding other programs or data, e.g., one or more scripts stored in a HyperText Markup Language (HTML) document, stored in a single file specific to the program discussed, or stored in a plurality of collaborative files (e.g., a file that stores one or more modules, subroutines, or portions of code).

As examples, executable instructions may be deployed to execute on one electronic apparatus, or on a plurality of electronic apparatuses located at one location, or to execute on a plurality of electronic apparatuses distributed across a plurality of locations and interconnected by a communications network.

Figure 11:
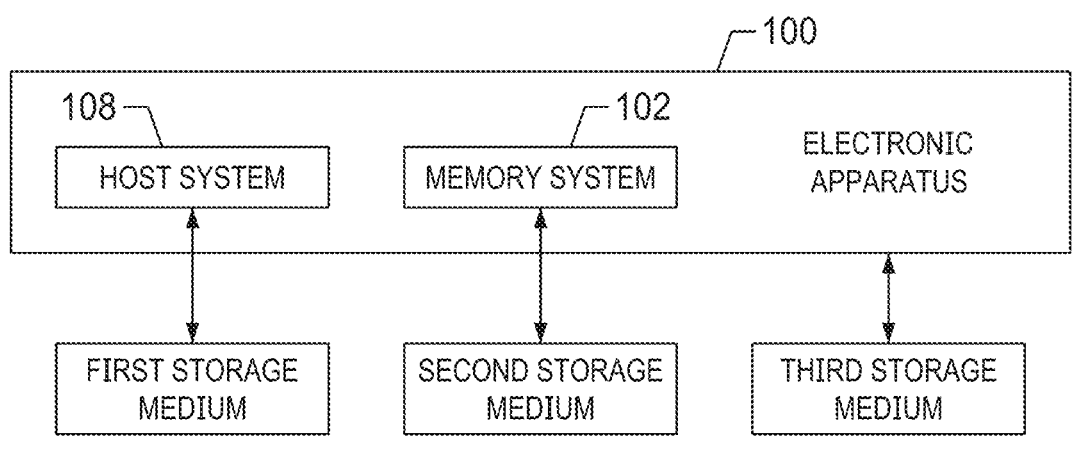
FIG. 11 is a schematic structural diagram of a storage medium provided by an example of present disclosure.

In some examples, referring to FIG. 11, FIG. 11 is a schematic structural diagram of a storage medium provided by an example of present disclosure; wherein, the storage medium includes a first storage medium corresponding to the host system 108, a second storage medium corresponding to the memory system 102, and a third storage medium corresponding to the electronic apparatus; when the executable instructions are executed by the host system, the first storage medium may be used to implement the operations of the operating method of the host system in the examples of the present disclosure described above; when the executable instructions are executed by the memory system, the second storage medium may be used to implement the operations of the operating method of the memory system in the examples of the present disclosure described above; and when the executable instructions are executed by the electronic apparatus, the third storage medium may be used to implement the operations of the operating method of the electronic apparatus in the examples of the present disclosure described above.

It should be understood that reference throughout the specification to "one example" or "an example" means that a feature, structure or characteristic related to an example is included in at least one example of the present disclosure. Thus, appearances of "in one example" or "in an example" in various places throughout the specification are not necessarily referring to a same example. Furthermore, these example features, structures or characteristics may be combined in any appropriate manner in one or more examples. It should be understood that in various examples of the present disclosure, sequence numbers of the processes described above do not mean the execution order, and the execution order of each process should be determined by its function and internal logic, and should not constitute any limitation to implementation process of examples of the present disclosure. The serial numbers of examples of the present disclosure described above are for the purpose of description only, and do not represent the advantages and disadvantages of the examples.

The methods disclosed in several method examples provided in the present disclosure may be combined arbitrarily without conflicts to obtain new method examples.

The above are only example implementations of the present disclosure, but the protection scope of the present disclosure is not limited thereto. Changes or substitutions within the technical scope disclosed in the present disclosure that may be easily conceived by those skilled in the art shall fall within the protection scope of the present disclosure. Therefore, the protection scope of the present disclosure should be determined by the protection scope of the claims.

What is claimed is:

1. A memory system, comprising:
   a memory device comprising a first memory area and a second memory area, wherein the first memory area comprises a plurality of first memory cells employing a single-level mode to store data, the first memory area is a buffer of write booster, and the second memory area comprises a plurality of second memory cells employing a multi-level mode to store data; and
   a memory controller coupled to the memory device and configured to:
      receive a first instruction comprising an adjustment threshold; and
      based on the adjustment threshold and information related to the first memory area, transfer a part of data stored in the first memory area to the second memory area.

2. The memory system of claim 1, wherein the information related to the first memory area comprises a current storage space of the first memory area; and
   the memory controller is configured to:
      based on a magnitude relationship between a proportion of the current storage space of the first memory area to a total space of the first memory area and the adjustment threshold, determine a transfer mode for transferring the part of the data stored in the first memory area to the second memory area, different transfer modes corresponding to different transfer frequencies or transfer data amounts.

3. The memory system of claim 2, wherein the adjustment threshold comprises a first adjustment threshold corresponding to a first proportion; and the memory controller is configured to:

responsive to the proportion of the current storage space of the first memory area to the total space of the first memory area being less than or equal to the first proportion, transfer the part of the data stored in the first memory area to the second memory area according to a first frequency using a first transfer mode; and responsive to the proportion of the current storage space of the first memory area to the total space of the first memory area being greater than the first proportion, transfer the part of the data stored in the first memory area to the second memory area according to a second frequency using a second transfer mode or not transfer the data stored in the first memory area.

4. The memory system of claim 3, wherein the adjustment threshold comprises a second adjustment threshold corresponding to a second proportion larger than the first proportion; and the memory controller is configured to:

responsive to the proportion of the current storage space of the first memory area to the total space of the first memory area being greater than the first proportion and less than the second proportion, transfer the part of the data stored in the first memory area to the second memory area according to a second frequency using a second transfer mode; and responsive to the proportion of the current storage space of the first memory area to the total space of the first memory area being greater than the second proportion, not transfer the data stored in the first memory area.

5. The memory system of claim 3, wherein the first frequency corresponding to the first transfer mode is greater than the second frequency corresponding to the second transfer mode.

6. The memory system of claim 3, wherein the first transfer mode is to continue data transfer when the memory system is in an idle state until all data to be transferred is transferred or the memory system exits the idle state; and the second transfer mode is to transfer the part of the data stored in the first memory area when the memory system is in an idle state.

7. The memory system of claim 1, wherein the memory controller is configured to:

receive a second instruction, the second instruction instructing the memory system to enter an automatic adjustment mode;

in response to the second instruction, receive the first instruction, the first instruction comprising the adjustment threshold; and obtain the information related to the first memory area according to a preset period.

8. The memory system of claim 1, wherein the memory controller is further configured to:

receive a third instruction, the third instruction instructing the memory system to enter a passive adjustment mode;

after the third instruction, receive a fourth instruction, the fourth instruction instructing to transfer the data stored in the first memory area to the second memory area according to a specified transfer mode; and in response to the fourth instruction, transfer the data stored in the first memory area to the second memory area according to the specified transfer mode.

9. The memory system of claim 1, wherein the memory controller is configured to:

control the memory device to read the part of the data stored in the first memory area according to a preset transfer mode; and write the read data to the second memory area.

10. An electronic apparatus, comprising:

a host system; and a memory system coupled to the host system, wherein the memory system comprises a memory device and a memory controller coupled to the memory device, the memory device comprises a first memory area and a second memory area, the first memory area comprises a plurality of first memory cells employing a single-level mode to store data, the first memory area is a buffer of write booster, and the second memory area comprises a plurality of second memory cells employing a multi-level mode to store data, wherein:

the host system is configured to send a first instruction comprising an adjustment threshold;

the memory controller is configured to:

receive the first instruction from the host system; and based on the adjustment threshold and information related to the first memory area, transfer a part of the data stored in the first memory area to the second memory area.

11. The electronic apparatus of claim 10, wherein the host system is further configured to:

send a third instruction instructing the memory system to enter a passive adjustment mode; and send a fourth instruction after sending the third instruction; and the memory controller is further configured to in response to the fourth instruction, transfer the data stored in the first memory area to the second memory area according to a specified transfer mode.

12. The electronic apparatus of claim 10, wherein the information related to the first memory area comprises a current storage space of the first memory area; and the memory controller is further configured to:

based on a magnitude relationship between a proportion of the current storage space of the first memory area to a total space of the first memory area and the adjustment threshold, determine a transfer mode for transferring the part of the data stored in the first memory area to the second memory area, different transfer modes corresponding to different transfer frequencies or transfer data amounts.

13. The electronic apparatus of claim 12, wherein the host system is further configured to send a second instruction before the first instruction, the second instruction instructing the memory system to enter an automatic adjustment mode.

14. An operating method of a memory system comprising a memory device, the memory device comprising a first memory area and a second memory area, the first memory area comprising a plurality of first memory cells employing a single-level mode to store data, the first memory area being a buffer of write booster, the second memory area comprising a plurality of second memory cells employing a multi-level mode to store data, and the operating method comprising:

receiving a first instruction comprising an adjustment threshold; and based on the adjustment threshold and information related to the first memory area, transferring a part of data stored in the first memory area to the second memory area.

15. The operating method of claim 14, wherein the information related to the first memory area comprises a current storage space of the first memory area; and based on the adjustment threshold and the information related to the first memory area, transferring the part of the data stored in the first memory area to the second memory area comprises:

based on a magnitude relationship between a proportion of the current storage space of the first memory area to a total space of the first memory area and the adjustment threshold, determining a transfer mode for transferring the part of the data stored in the first memory area to the second memory area, different transfer modes corresponding to different transfer frequencies and/or transfer data amount.

16. The operating method of claim 15, wherein the adjustment threshold comprises a first adjustment threshold corresponding to a first proportion; and based on the magnitude relationship between the proportion of the current storage space of the first memory area to the total space of the first memory area and the adjustment threshold, determining a transfer mode for transferring data stored in the first memory area to the second memory area comprises:

responsive to the proportion of the current storage space of the first memory area to the total space of the first memory area being less than or equal to the first proportion, transferring the part of the data stored in the first memory area to the second memory area according to a first frequency using a first transfer mode; and responsive to the proportion of the current storage space of the first memory area to the total space of the first memory area being greater than the first proportion, transferring the part of the data stored in the first memory area to the second memory area according to a second frequency using a second transfer mode or not transferring the data stored in the first memory area, wherein the first frequency corresponding to the first transfer mode is greater than the second frequency corresponding to the second transfer mode.

17. The operating method of claim 16, wherein the first transfer mode is to continue data transfer when the memory system is in an idle state until all data to be transferred is transferred or the memory system exits the idle state; and the second transfer mode is to transfer the part of the data stored in the first memory area when the memory system is in an idle state.

18. The operating method of claim 16, wherein the adjustment threshold comprises a second adjustment threshold corresponding to a second proportion larger than the first proportion; and responsive to the proportion of the current storage space of the first memory area to the total space of the first memory area being greater than the first proportion, transferring the part of the data stored in the first memory area to the second memory area according to a second frequency using a second transfer mode or not transferring the data stored in the first memory area comprise:

responsive to the proportion of the current storage space of the first memory area to the total space of the first memory area being greater than the first proportion and less than the second proportion, transferring the part of the data stored in the first memory area to the second memory area according to a second frequency using a second transfer mode; and responsive to the proportion of the current storage space of the first memory area to the total space of the first memory area being greater than the second proportion, not transferring the data stored in the first memory area.

19. The operating method of claim 14, further comprising:

receiving a second instruction, the second instruction instructing the memory system to enter an automatic adjustment mode;

in response to the second instruction, receiving the first instruction, wherein the first instruction comprises the adjustment threshold; and obtaining the information related to the first memory area according to a preset period.

20. The operating method of claim 14, further comprising:

receiving a third instruction, the third instruction instructing the memory system to enter a passive adjustment mode;

after the third instruction, receiving a fourth instruction, wherein the fourth instruction instructs to transfer data stored in the first memory area to the second memory area according to a specified transfer mode; and in response to the fourth instruction, transferring the data stored in the first memory area to the second memory area according to the specified transfer mode.

* * * * *